United States Patent [19]

Bonnstetter et al.

[11] Patent Number: 5,551,880
[45] Date of Patent: Sep. 3, 1996

[54] EMPLOYEE SUCCESS PREDICTION SYSTEM

[76] Inventors: Bill J. Bonnstetter, 6602 E. Ludlow Dr., Scottsdale, Ariz. 85254; Jon C. Hall, 101 N. Center, Zearing, Iowa 50278

[21] Appl. No.: 428,354

[22] Filed: Apr. 21, 1995

Related U.S. Application Data

[63] Continuation of Ser. No. 7,484, Jan. 22, 1993, abandoned.

[51] Int. Cl.⁶ ........................................ G09B 7/00
[52] U.S. Cl. .......................... 434/236; 434/237; 434/322
[58] Field of Search .................................. 434/236–238, 434/362, 322, 323

[56] References Cited

U.S. PATENT DOCUMENTS 5,326,270  7/1994  Ostby et al. ............................. 434/362

OTHER PUBLICATIONS

Russell J. Watson, Ed.D. "A Correlational Study of Business Values Inventory and the Style Analysis Instrument", Jul. 20–21, 1990 (16 pages).

"Manual for Personal Interest & Values & Success Performance Index & BFI" Draft, (14 pages).

Behavioral–Values Research Associates, "Style Analysis" 1992, (14 pages).

Russell J. Watson, Ed.D. "A Statistical Comparison Between the T.T.I. Style Analysis and the Performax Personal Profile System", Mar., 1989 (44 pages).

*Primary Examiner*—Richard J. Apley
*Assistant Examiner*—Glenn E. Richman
*Attorney, Agent, or Firm*—Zarley, McKee, Thomte, Voorhees, & Sease

[57] ABSTRACT

A system for predicting potential of success of an individual for a particular job or task. Behavioral and values information is derived from the individual. This information is then analyzed and compared against standards for behavior and values previously calculated for the specific job. An evaluation can then be made of the applicant's responses to the standards to predict success of a perspective employee for the particular job, or to attempt to improve performance of a current employee for a specific job.

6 Claims, 16 Drawing Sheets

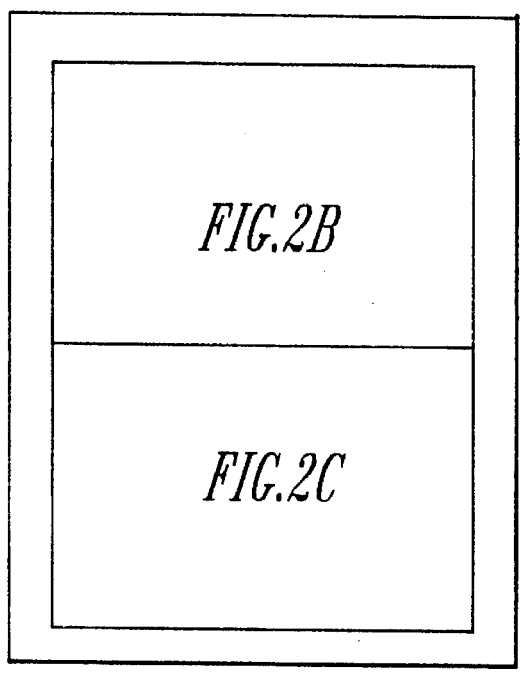
FIG.2A
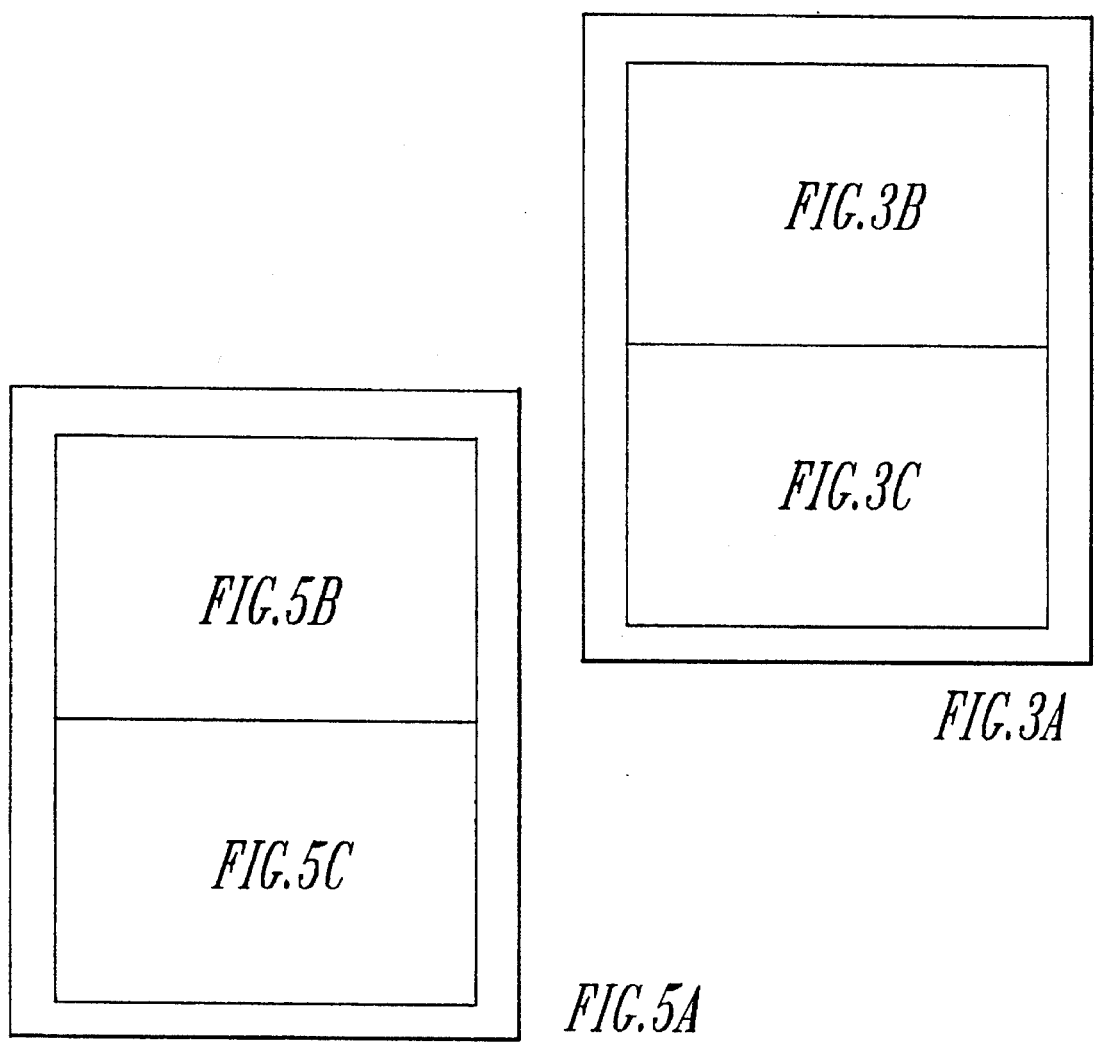
FIG.3A
FIG.5A

| | M | L | | | M | L | |
|---|---|---|---|---|---|---|---|
| 1 | ☐ | ☐ | GENTLE, KINDLY | 13 | ☐ | ☐ | AGGRESSIVE, CHALLENGER, TAKES ACTION |
| | ☐ | ☐ | PERSUASIVE, CONVINCING | | ☐ | ☐ | LIFE OF THE PARTY, OUTGOING, ENTERTAINING |
| | ☐ | ☐ | HUMBLE, RESERVED, MODEST | | ☐ | ☐ | EASY MARK, EASILY TAKEN ADVANTAGE OF |
| | ☐ | ☐ | ORIGINAL, INVENTIVE, INDIVIDUALISTIC | | ☐ | ☐ | FEARFUL, AFRAID |
| 2 | ☐ | ☐ | ATTRACTIVE, CHARMING, ATTRACTS OTHERS | 14 | ☐ | ☐ | CAUTIOUS, WARY, CAREFUL |
| | ☐ | ☐ | COOPERATIVE, AGREEABLE | | ☐ | ☐ | DETERMINED, DECIDED, UNWAVERING, STAND FIRM |
| | ☐ | ☐ | STUBBORN, UNYIELDING | | ☐ | ☐ | CONVINCING, ASSURING |
| | ☐ | ☐ | SWEET, PLEASING | | ☐ | ☐ | GOOD-NATURED, PLEASANT |
| 3 | ☐ | ☐ | EASILY LED, FOLLOWER | 15 | ☐ | ☐ | WILLING, GO ALONG WITH |
| | ☐ | ☐ | BOLD, DARING | | ☐ | ☐ | EAGER, ANXIOUS, |
| | ☐ | ☐ | LOYAL, FAITHFUL, DEVOTED | | ☐ | ☐ | AGREEABLE, CONSENTING |
| | ☐ | ☐ | CHARMING, DELIGHTFUL | | ☐ | ☐ | HIGH-SPIRITED, LIVELY, ENTHUSIASTIC |
| 4 | ☐ | ☐ | OPEN-MINDED, RECEPTIVE | 16 | ☐ | ☐ | CONFIDENT, BELIEVES IN SELF, ASSURED |
| | ☐ | ☐ | OBLIGING, HELPFUL | | ☐ | ☐ | SYMPATHETIC, COMPASSIONATE, UNDERSTANDING |
| | ☐ | ☐ | WILL POWER, STRONG WILLED | | ☐ | ☐ | TOLERANT |
| | ☐ | ☐ | CHEERFUL, JOYFUL | | ☐ | ☐ | ASSERTIVE, AGGRESSIVE |
| 5 | ☐ | ☐ | JOVIAL, JOKING | 17 | ☐ | ☐ | WELL-DISCIPLINED, SELF-CONTROLLED |
| | ☐ | ☐ | PRECISE, EXACT | | ☐ | ☐ | GENEROUS, WILLING TO SHARE |
| | ☐ | ☐ | NERVY, GUTSY, BRAZEN | | ☐ | ☐ | ANIMATED, USES GESTURES FOR EXPRESSION |
| | ☐ | ☐ | EVEN-TEMPERED, CALM, NOT EASILY EXCITED | | ☐ | ☐ | PERSISTENT, UNRELENTING, REFUSES TO QUIT |
| 6 | ☐ | ☐ | COMPETITIVE, SEEKING TO WIN | 18 | ☐ | ☐ | ADMIRABLE, DESERVING OF PRAISE |
| | ☐ | ☐ | CONSIDERATE, CARING, THOUGHTFUL | | ☐ | ☐ | KIND, WILLING TO GIVE OR HELP |
| | ☐ | ☐ | OUTGOING, FUN LOVING, SOCIALLY STRIVING | | ☐ | ☐ | RESIGNED, GIVES IN |
| | ☐ | ☐ | HARMONIOUS, AGREEABLE | | ☐ | ☐ | FORCE OF CHARACTER, POWERFUL |

FIG. 2B

| 7 | | 19 | |
|---|---|---|---|
| ☐ | FUSSY, HARD TO PLEASE | ☐ | RESPECTFUL, SHOWS RESPECT |
| ☐ | OBEDIENT, WILL DO AS TOLD, DUTIFUL | ☐ | PIONEERING, EXPLORING, ENTERPRISING |
| ☐ | UNCONQUERABLE, DETERMINED | ☐ | OPTIMISTIC, POSITIVE VIEW |
| ☐ | PLAYFUL, FRISKY, FULL OF FUN | ☐ | ACCOMMODATING, WILLING TO PLEASE, READY TO HELP |
| 8 | | 20 | |
| ☐ | BRAVE, UNAFRAID, COURAGEOUS | ☐ | ARGUMENTATIVE, CONFRONTING |
| ☐ | INSPIRING, STIMULATING, MOTIVATING | ☐ | ADAPTABLE, FLEXIBLE |
| ☐ | SUBMISSIVE, YIELDING, GIVES IN | ☐ | NONCHALANT, CASUALLY INDIFFERENT |
| ☐ | TIMID, SHY, QUIET | ☐ | LIGHT-HEARTED, CAREFREE |
| 9 | | 21 | |
| ☐ | SOCIABLE, ENJOYS COMPANY OF OTHERS | ☐ | TRUSTING, FAITH IN OTHERS |
| ☐ | PATIENT, STEADY, TOLERANT | ☐ | CONTENTED, SATISFIED |
| ☐ | SELF-RELIANT, INDEPENDENT | ☐ | POSITIVE, ADMITTING NO DOUBT |
| ☐ | SOFT-SPOKEN, MILD, RESERVED | ☐ | PEACEFUL, TRANQUIL |
| 10 | | 22 | |
| ☐ | ADVENTUROUS, WILLING TO TAKE CHANCES | ☐ | GOOD MIXER, LIKES BEING WITH OTHERS |
| ☐ | RECEPTIVE, OPEN TO SUGGESTIONS | ☐ | CULTURED, EDUCATED, KNOWLEDGEABLE |
| ☐ | CORDIAL, WARM, FRIENDLY | ☐ | VIGOROUS, ENERGETIC |
| ☐ | MODERATE, AVOIDS EXTREMES | ☐ | LENIENT, NOT OVERLY STRICT, TOLERANT OF OTHERS' ACTIONS |
| 11 | | 23 | |
| ☐ | TALKATIVE, CHATTY | ☐ | COMPANIONABLE, EASY TO BE WITH |
| ☐ | CONTROLLED, RESTRAINED | ☐ | ACCURATE, CORRECT |
| ☐ | CONVENTIONAL, DOING IT THE USUAL WAY, CUSTOMARY | ☐ | OUTSPOKEN, SPEAKS FREELY AND BOLDLY |
| ☐ | DECISIVE, CERTAIN, FIRM IN MAKING A DECISION | ☐ | RESTRAINED, RESERVED, CONTROLLED |
| 12 | | 24 | |
| ☐ | POLISHED, SMOOTH TALKER | ☐ | RESTLESS, UNABLE TO REST OR RELAX |
| ☐ | DARING, RISK-TAKER | ☐ | NEIGHBORLY, FRIENDLY |
| ☐ | DIPLOMATIC, TACTFUL TO PEOPLE | ☐ | POPULAR, LIKED BY MANY OR MOST PEOPLE |
| ☐ | SATISFIED, CONTENT, PLEASED | ☐ | ORDERLY, NEAT, ORGANIZED |

FIG. 2C

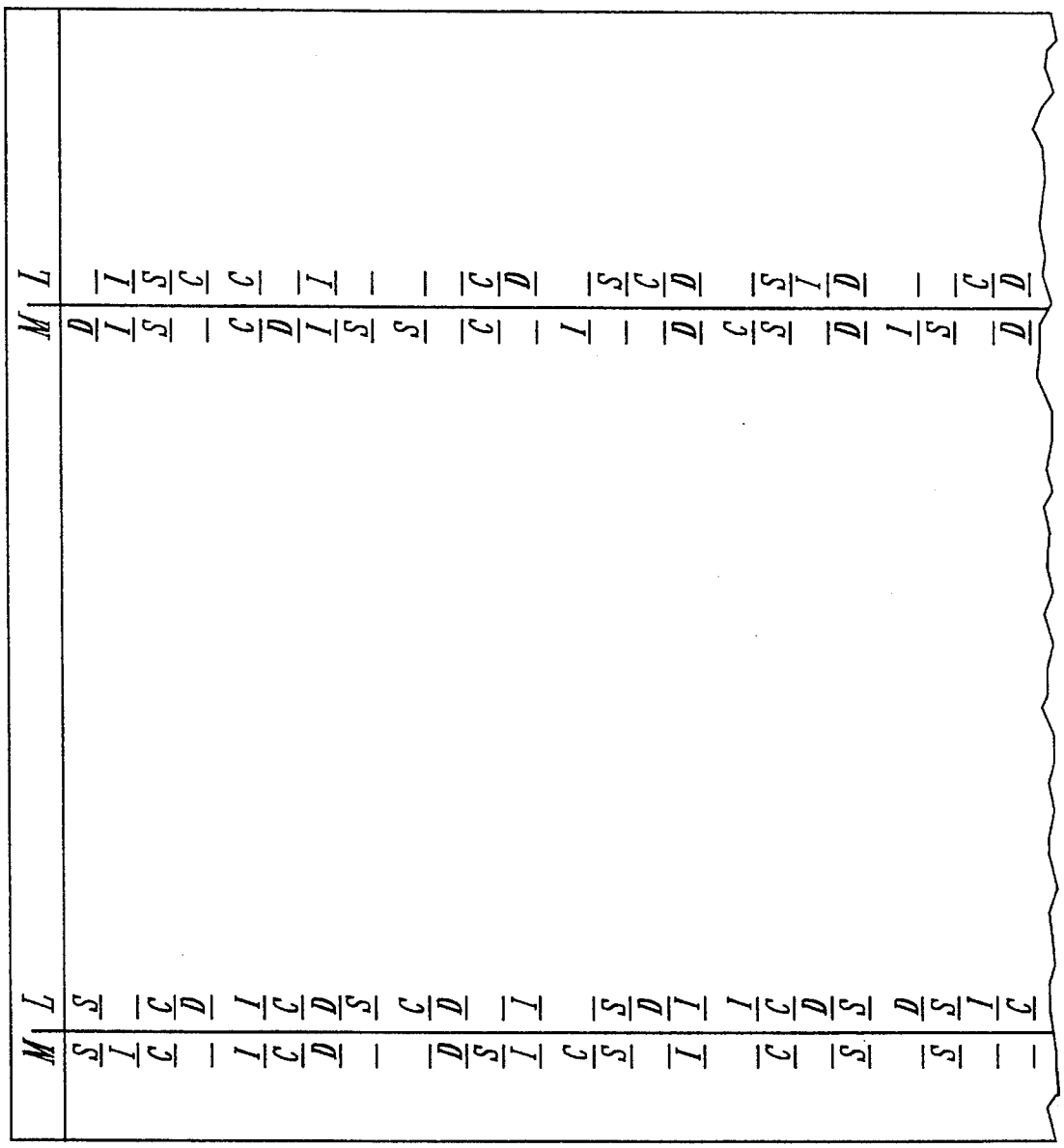

MOST
GRAPH I
RESPONSE TO ENVIRONMENT

| D | I | S | C |
|---|---|---|---|
| 20<br>16<br>15<br>14<br>13<br>12<br>11<br>10<br>9<br>8<br>7 | 17<br>10<br>9<br>8<br>7<br>6<br>5<br>4 | 19<br>12<br>11<br>10<br>9<br>8<br>7<br>6<br>5 | 15<br>9<br>8<br>7<br>6<br>5<br>4 |
| 6<br>5<br>4<br>3<br>2<br>1<br>0 | 3<br>2<br>1<br>0 | 4<br>3<br>2<br>1<br>0 | 3<br>2<br>1<br>0 |

| D | I | S | C | BLANK | |
|---|---|---|---|---|---|
| 10 | 3 | 0 | 1 | 10 | =24 |

ROW 1

LEAST
GRAPH II
BASIC STYLE

| D | I | S | C |
|---|---|---|---|
| 0<br>1<br>2<br>3<br>4<br>5 | 0<br>1<br>2<br>3<br>4 | 0<br>1<br>2<br>3<br>4<br>5<br>6 | 0<br>1<br>2<br>3<br>4<br>5<br>6 |
| 6<br>7<br>8<br>9<br>10<br>11<br>12<br>13<br>14<br>15<br>16<br>21 | 5<br>6<br>7<br>8<br>9<br>10<br>11<br>19 | 7<br>8<br>9<br>10<br>11<br>12<br>13<br>19 | 7<br>8<br>9<br>10<br>11<br>12<br>13<br>16 |

| D | I | S | C | BLANK | |
|---|---|---|---|---|---|
| 1 | 1 | 10 | 10 | 2 | =24 |

ROW 2

1. MY FAVORITE SUBJECT TO STUDY:

[P] _____ MATH/SCIENCE
[T] _____ POLITICAL SCIENCE
[R] _____ THEOLOGY
[S] _____ FINE ARTS
[E] _____ FINANCIAL PLANNING
[A] _____ SOCIAL STUDIES

2. MY PERSONAL INTERESTS ARE:

[A] _____ INDEPENDENCE
[T] _____ JOINING A GROUP WITH TRADITIONS
[E] _____ APPRECIATION OF THE BEAUTY OF NATURE
[P] _____ FINANCIAL SECURITY
[R] _____ SERVICE TO OTHERS
[S] _____ KNOWLEDGE

3. LEISURE ACTIVITIES THAT I ENJOY:

[R] _____ VOLUNTEER WORK
[S] _____ STUDYING NEW THINGS
[P] _____ SPORTS
[E] _____ INVESTING OR SPENDING MONEY
[T] _____ GOING TO MUSEUMS
[A] _____ THINKING ABOUT LIFE

7. IF I WERE GIVEN $500,000 I WOULD:

[S] _____ PURCHASE AN ART COLLECTION
[E] _____ START MY OWN BUSINESS
[R] _____ GIVE SOME TO CHARITY
[A] _____ SAVE SOME/INVEST SOME
[T] _____ TAKE COURSES TO GAIN KNOWLEDGE
[P] _____ DONATE TO CHURCH FUND

8. I THINK OUR TAX MONEY SHOULD BE SPENT ON:

[S] _____ HELP FOR THE HOMELESS
[P] _____ MILITARY/DEFENSE
[E] _____ EDUCATION
[T] _____ FUNDING OF THE ARTS
[A] _____ REDUCING THE FEDERAL DEFICIT
[R] _____ DRUG CONTROL

9. PEOPLE I ADMIRE AS ROLE MODELS:

[T] _____ MOTHER THERESA
[A] _____ GENERAL GEORGE PATTON
[S] _____ JOHN D. ROCKEFELLER
[E] _____ MICHELANGELO
[P] _____ ALBERT EINSTEIN
[R] _____ REV. BILLY GRAHAM

FIG. 5C

4. PERSONAL MOTIVATORS FOR ME ARE:

T ___ BEING A LEADER
P ___ CONTINUING EDUCATION
R ___ BEING A GOOD CITIZEN
A ___ HELPING OTHERS
E ___ INCREASING MY NET WORTH
S ___ ARTS/CRAFTS

5. MY CAREER GOALS:

P ___ ARTIST
R ___ RESEARCHER
A ___ BUSINESS OWNER
E ___ MANAGER
S ___ HISTORIAN
I ___ SOCIAL REFORMER

6. MY DESIRE FOR IMPROVEMENT MAY INCLUDE:

S ___ SPIRITUAL GROWTH
D ___ HELPING OTHERS
P ___ LEADERSHIP ROLES
E ___ SECURITY FOR RETIREMENT
A ___ ADDITIONAL EDUCATION
R ___ BEAUTIFICATION OF PERSONAL SURROUNDINGS

10. THE WAY I WOULD LIKE TO CONTRIBUTE TO SOCIETY:

A ___ HELPING THE SICK AND DISADVANTAGED
P ___ BEING A BUSINESS PERSON
S ___ BEING A TEAM PLAYER
E ___ PROTECTING THE ENVIRONMENT
I ___ BEING AN INVENTOR
R ___ INITIATOR OF COMMUNITY ACTIVITIES

11. MY PERSONAL GOALS:

S ___ REFORMER
P ___ ELECTED OFFICIAL
I ___ ECONOMIC FREEDOM
A ___ DISCOVERING NEW TECHNOLOGY
E ___ ARTISTIC EXPRESSION
R ___ PERSONAL GROWTH

12. MY OUTSIDE INTERESTS:

S ___ TEACHING
P ___ ACTING
E ___ COMMUNITY PROJECTS
A ___ PART-TIME BUSINESS
E ___ POLITICS
R ___ CHURCH ACTIVITIES

EMPLOYEE SUCCESS PREDICTION SYSTEM

This is a continuation of application Ser. No. 08/077,484 filed on Jan. 22, 1993; now abandoned.

BACKGROUND OF THE INVENTION

A. Field of the Invention

The present invention relates to a method and system useful for predicting the success of an individual for a particular job, and in particular, using measured behavioral and values characteristics of the individual as part of the analysis.

B. Problems in the Art

It is difficult to accurately predict or analyze the tendency or potential for success a person may have for a particular job or task. This is especially true if one has no personal experience with the individual. Predictions regarding how well a person will do a job on the basis of simply a resume or personal interview are imprecise. Some studies have indicated that the accuracy of such predictions is no more than in the 10% range, if based simply on personal interviews.

Information regarding prior experience, training, and education of an individual many times is important in evaluating the potential of a person for a particular job. However, it has been found this alone also is not generally conducive to a highly accurate prediction rate for matching an employee with a particular job.

Therefore, attempts have been made to increase the accuracy in such predictions. Some current methods try to achieve greater success by looking at characteristics about the individual other than simply experience and education.

Some attempts have used behavior-type questions or surveys towards this end. Others try to probe what sort of overall values the individual has. In both instances, the investigation deals with either behavior or values, but not both.

While some of these types of analyses have improved the prediction accuracy rate for successful employees for given jobs, they have not yet achieved a high enough validity for general acceptance.

Better predictability (for example, in the 70% or higher range) is desirable. There is therefore room for improvement in the art. The ability to better predict the success of persons for defined job positions can materially affect the bottom line of a company.

The problems with predicting the tendency or potential for how well a person will do a job, or isolating areas for improvement of the person, include the reality that there are many variables that relate to a particular job or task and to whether that job or task will be performed adequately by a person. Therefore, while more objective information such as educational experience, job experience, etc. can give some insight into the capabilities of an individual for a given job, other attributes and characteristics of the individual relating to values motivation, etc. can be extremely important in the job potential of a person.

As stated above, the general behavioral makeup of an individual has been found to be relevant to predicting performance or action. However, behavior itself has many variables. It is therefore difficult to know which areas of behavior should be probed for certain jobs or tasks.

An individual's general values also have been found to provide an indication of how a person will react to various matters. Again, however, it is difficult to know what values and what characteristics of values are important for predicting success in a particular job or task.

Problems also exist with regard to laws and regulations relating to employment. For example, employers can not ask potential employees and current employees questions about certain subject matter. Some of those areas include marital status, religion, and political affiliation. Therefore, accurate job success prediction methods must comply with such laws and regulations with respect to the information they can seek from an individual, and yet still be accurate predictions.

Although others have looked to behavioral traits or values-type characteristics of individuals as ways to predict reaction of persons to certain tasks or jobs, no one has combined an investigation into both behavioral and values characteristics, and used the combined analysis for such predictions.

It is therefore a primary object of the invention to provide a method and system for predicting success of individuals for particular jobs which improves over the state of the art in accuracy.

A further object of the present invention is to provide a method as above-described which predicts potential success based on an analysis of information relating to both behavior and values of an individual.

A still further object of the present invention is to provide a method as above-described which allows comparison between individuals.

Another object of the present invention is to provide a method as above-described which allows a current employee to evaluate his/her performance and decide areas where there are room for improvement in performance.

Another object of the present invention is to provide a method as above-described which produces more accurate predictions of job success.

A still further object of the present invention is to provide a method as above described which identifies specific factors required to be successful for a particular job at a particular company.

Another object of the present invention is to provide focus and direction for managing or training an individual.

A still further object of the present invention is to provide a method as above described which would allow a company to quantify the makeup and performance of its employees as a whole.

Another object of the present invention is to provide a method as above described which could validate the type of behavior and values required to be successful for a particular job.

Another object of the present invention is to provide a method as above described which allows an employer to identify employees who are masking their natural behavior in their job, who are unmotivated, or who may be considering a career change or employment with another organization.

Another object of the present invention is to provide a method as above described which can screen potential job applicants.

Another object of the present invention is to provide a method as above described which allows an employer to keep track of the behavioral skills of an employee.

These and other objects, features, and advantages of the present invention will become more apparent with reference to the accompanying specification and claims.

SUMMARY OF THE INVENTION

The present invention utilizes behavioral and values information from an individual to predict specific job performance potential. The invention can be used to screen job applicants or provide information useful in training or evaluating present employees.

Information regarding an individual's overall behavior and values is obtained from an individual by presenting questionnaires directed towards behavior and values. Answers of the individual are quantified by first correlating the individual's responses to the behavior questionnaire into two sets of general or overall behavior characteristics. One set represents the basic or natural overall behavior of the person; the other set represents what the person perceives to be appropriate behavior for the particular job, or how the person responds to the environment of the particular job. Numerical profiles of the overall behavioral tendencies of the person, both naturally without regard to the specific job environment and with regard to how he/she does or will respond to the specific job environment are established for the behavior characteristics for each set.

Overall values characteristics of the individual are quantitated in a similar way. Responses to the values questionnaire are correlated into one set of general or overall "values" characteristics. A numerically rated profile of the person's general values in a set of values characteristics is then established.

Each behavior characteristic for the behavior profile and each values characteristic of the values profile has a numerical quantity. The numerical quantities are correlated to numerical scales. The scales are not necessarily the same for each profile. Essentially, these numerical quantities and scales are pre-selected based on studies and validations as to how the responses to the questionnaires should be weighted for a particular job category.

The invention therefore, in a pre-selected manner, breaks each numerical scale into zones and assigns each zone a numerical quantity. This allows the profile to be converted to compatible scales to allow behavior and values characteristics to be merged.

Basic and response ratings are thus established for each of the behavior factors for the job. The overall values profile numerical quantities are used to determine a pre-selected weighted numerical values quantity for each behavior factor.

For each behavior factor, the values rating is then combined with the basic behavior rating to form a merged basic behavior/values rating. The values rating is also combined with the response behavior rating to form a merged response behavior/values rating. The basic, response, and values ratings are numerically converted so that the final combined ratings are quantified on the same numerical scale.

The merged basic/values rating and merged response/values rating for each behavior factor can then be compared to one another and against standards.

Therefore, once the overall basic and response behavior profiles and overall values profile for an individual are generated, they are used to predict success for a particular job. The collection of specific behavior factors are uniquely selected for each job. The overall basic and response behavior profile numerical quantities determine which pre-selected weighted numerical quantities are assigned for the particular behavior factor for the job.

Reports can be generated using the quantified relationships between behavior and values. The results consist of a merger of the quantified results assigned to the individual's answers on behavior and values. These results are used to analyze and predict the potential of the person for a specific job. The system therefore converts the raw answers of the individual into a report having a format which allows the employer to understand the potential of the person for a particular job in a particular job environment, by taking into account the particular job environment.

Results of the individual can then be compared to standards. Standards can include theoretical levels, results of persons known to be superior performers for the job, or other selected standards.

The report can therefore be used for such things as predicting potential of job applicant for a given position, as a measuring stick with regard to analyzing performance of a current employee, or other uses.

It can also allow an analysis of the particular environment that exists for a particular job, including identifying superior and inferior performers, as well as stress conditions or motivational problems.

BRIEF DESCRIPTION OF THE DRAWINGS

FIGS. 2A–2C illustrate a reproduction of a behavioral questionnaire according to the preferred embodiment of the invention.

FIGS. 3A–3C illustrate a reproduction of a scoring sheet that can be used with the behavioral questionnaire of FIG. 2A–2C.

FIG. 4 is a reproduction of a scoring summary and graphical result that can be used with the forms of FIGS. 2A–2C 3A–3C.

FIGS. 5A–5C illustrate a reproduction of a values questionnaire according to the preferred embodiment of the invention.

DESCRIPTION OF PREFERRED EMBODIMENT

A. Overview

Figure 1:
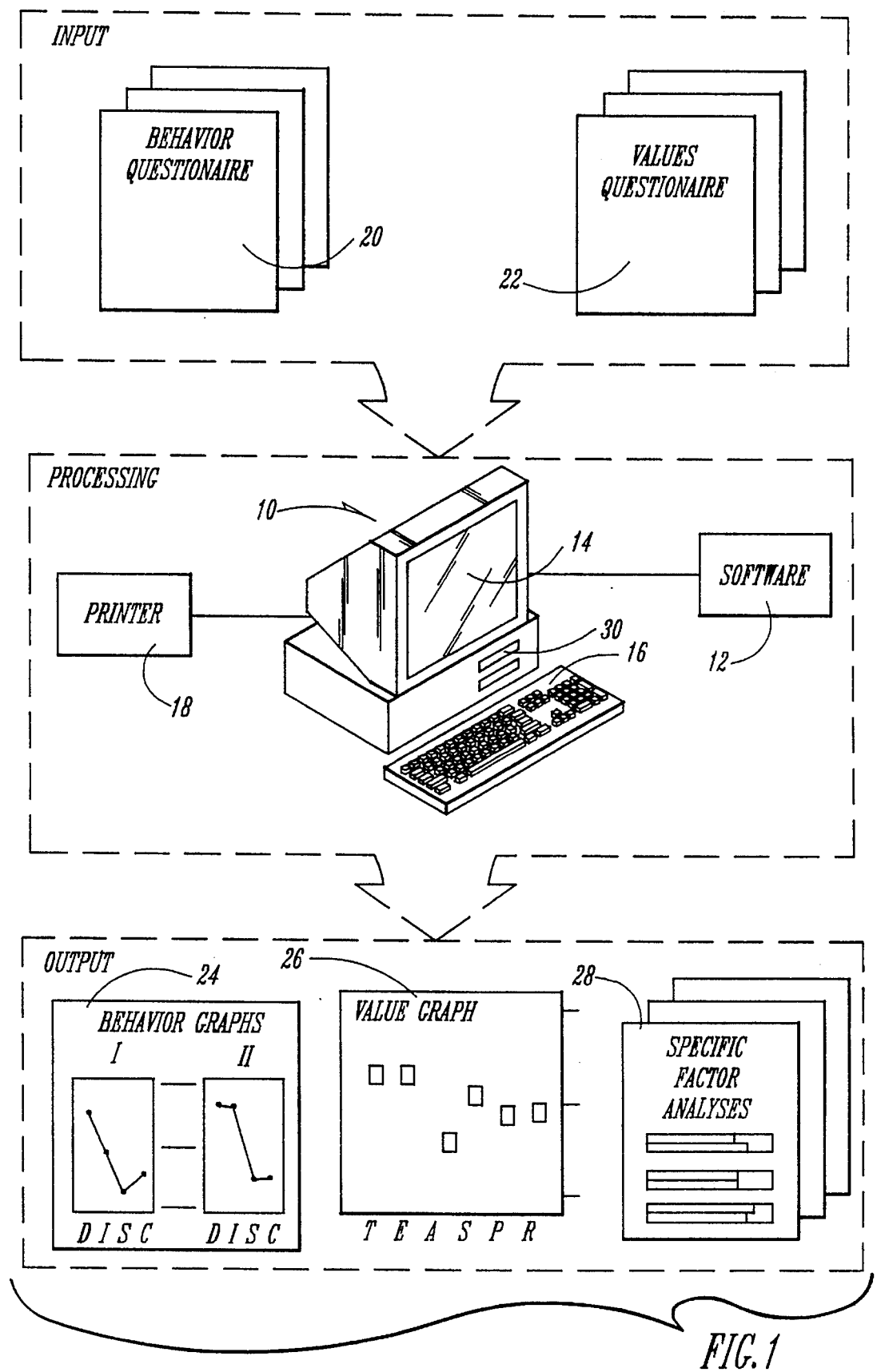
FIG. 1 is a diagrammatical view of a system according to a preferred embodiment of the present invention.

To assist in a better understanding the invention, a specific embodiment of the present invention will now be described in detail. It is to be understood that this is one form or embodiment the invention can take and that others are possible.

This detailed description will include reference to FIGS. 1–8. Reference numerals or letters will be used to indicate specific parts or locations in the figures. The same reference numerals or letters will be used to indicate the same parts and locations in all the figures unless otherwise indicated.

B. General System

FIG. 1 gives a diagrammatical overview of a preferred embodiment of a general system according to the present invention. This is a preferred embodiment and includes a computer 10, for example an IBM or an IBM compatible PC, with appropriate software 12, display screen 14, keyboard 16, and printer 18. The software for the preferred embodiment will be discussed in more detail later.

It is to be understood that while computer 10 facilitates operation of the system, it is not required. It does allow, however, for quick and easy input, processing, and recordation of results. The preferred embodiment could also be accomplished manually.

The system obtains information from an individual regarding behavior and values of that individual. This is accomplished by utilizing what will be called a behavior questionnaire 20 and a values questionnaire 22. FIG. 1 shows questionnaires 20 and 22 diagrammatically. Each contains a series of stimuli; here, for example, in the form of questions. The individual must respond to the questions. Specific examples of these questionnaires will be discussed later.

Questionnaires 20 and 22 can be work-sheets which can either be manually filled out by an individual and the answers then keyed into computer 10, or the questions or stimuli can be displayed on computer screen 14 and answers directly keyed in by the individual or an operator.

In the preferred embodiment, software 12 serves to process the information from questionnaires 20 and 22 in a manner which essentially quantifies the individual's answers into behavior and values categories, and then merges those quantified behavioral and values results into a format which is useful in predicting potential for success of the individual for a particular job or task.

The output of the system consists of reports which reflect the analysis of the input derived from questionnaires 20 and 22. Computer 10 allows questionnaire answers and the reports (or other information) to be stored in computer 10, displayed on screen 14, or printed as hard-copy reports on printer 18. FIG. 1 diagrammatically shows some of the types of output reports that are possible. Examples are graphs 24 relating to behavior, graph 26 relating to values, and a specific factor analysis report and graph 28 which can illustrate tendencies regarding specific behavioral factors related to a job, as modified by value factors. Report 28 can basically plot combined behavioral and values factors of a person relevant to the job based on an analysis of the person's input to questionnaires 20 and 22.

Therefore, the general system of the preferred embodiment allows a company, for example, to screen applicants or evaluate present employees. Behavioral and value-related information can be derived from questionnaires 20 and 22 from the individual, input into computer 10, and then evaluated and processed into reports which can be evaluated.

In the preferred embodiment, software 12 is contained on a computer disk (for example a 3½ or 5¼ floppy disk). As is well known to those skilled in the art, the disk can simply be inserted into a disk port 30 in computer 10. Utilizing the loading instructions for the particular computer 10, the program on the disk can be run. In the preferred embodiment the program will have an identification or information screen. It is menu driven. Specific features of the system and software will be discussed below.

C. Software Configuration

Software 12 of the preferred embodiment has two main menus. The first menu contains information regarding the program including program title, release number, serial number, status of reports, and other matters.

The program also has a printer interrupt menu that allows different options for shopping the printing process or for dealing with a printer malfunction, and an output menu allows the user to select the format of output from the system; for example a printed report, a display to screen, or simply save the information on computer disc storage for later use.

The other menu is called the file menu which allows access to the program's main features.

The file menu has the following options:

1. Respond on the computer,
2. Enter scores from instruments,
3. Print/Reprint a report,
4. Program configuration,
5. Select Program,
6. Quit.

The "program configuration" option allows the user to make sure that the particular described printer 18 is compatible with the program. It also allows customizing of the format of reports, configuration of the program for the particular display 14 (black and white or color), and allows creation of passwords for restricted access to information of the system.

The "reprint a report" option allows the user to select the output of the system with regard to how hard-copy reports are printed. For example, this portion of the program allows either a report on a specific individual or on a number of individuals to be printed. Alternatively, reports can be printed which compare a person to person, or compare a person to a pre-selected standard. In the preferred embodiment, the standard could either be one or more actual persons who have previously input responses to the questionnaires into the system, or it can be a hypothetical or theoretical standard set by the user or company.

The "respond on the computer" and "enter scores from instrument" options simply allow the system to either have the individual directly key in responses to the questionnaires 20 and 22 when displayed on display 14, or allow individuals to manually fill out questionnaires 20 and 22 and then have the results keyed into the computer.

It is to be understood that in this preferred embodiment two specific job categories are available for analysis. One job category is directed to management— that is to predict potential for success of an individual for a management-type position. The other classification is for sales-related jobs. The method can, of course, be used for other jobs also.

As will be discussed further below, each job category in this preferred embodiment utilizes some different behavioral categories. Therefore the software allows the individual or the company user to select at the beginning between a management job analysis or a sales job analysis.

D. Behavior Questionnaire

FIGS. 2A–2C (hereafter referred to collectively as FIG. 2) depict the behavior questionnaire 20 according to the preferred embodiment of the present invention. As can be seen, questionnaire 20 consists of twenty-four separate stimuli (the twenty-four boxes numbered 1, 2, . . . , 24). Each set consists of four statements or collections of words. The individual is required to mark which of the four collections of words is "most" like him/her; and which is "least" like him/her. Only one "most" and "least" selection can be given for each set. The collection of twenty-four sets of stimuli are based on the William Moulton Marsten 1928 book entitled "Emotions of Normal People". The stimuli are intended to probe the individual as to the general or overall behavior characteristics of the individual.

Figure 3C:
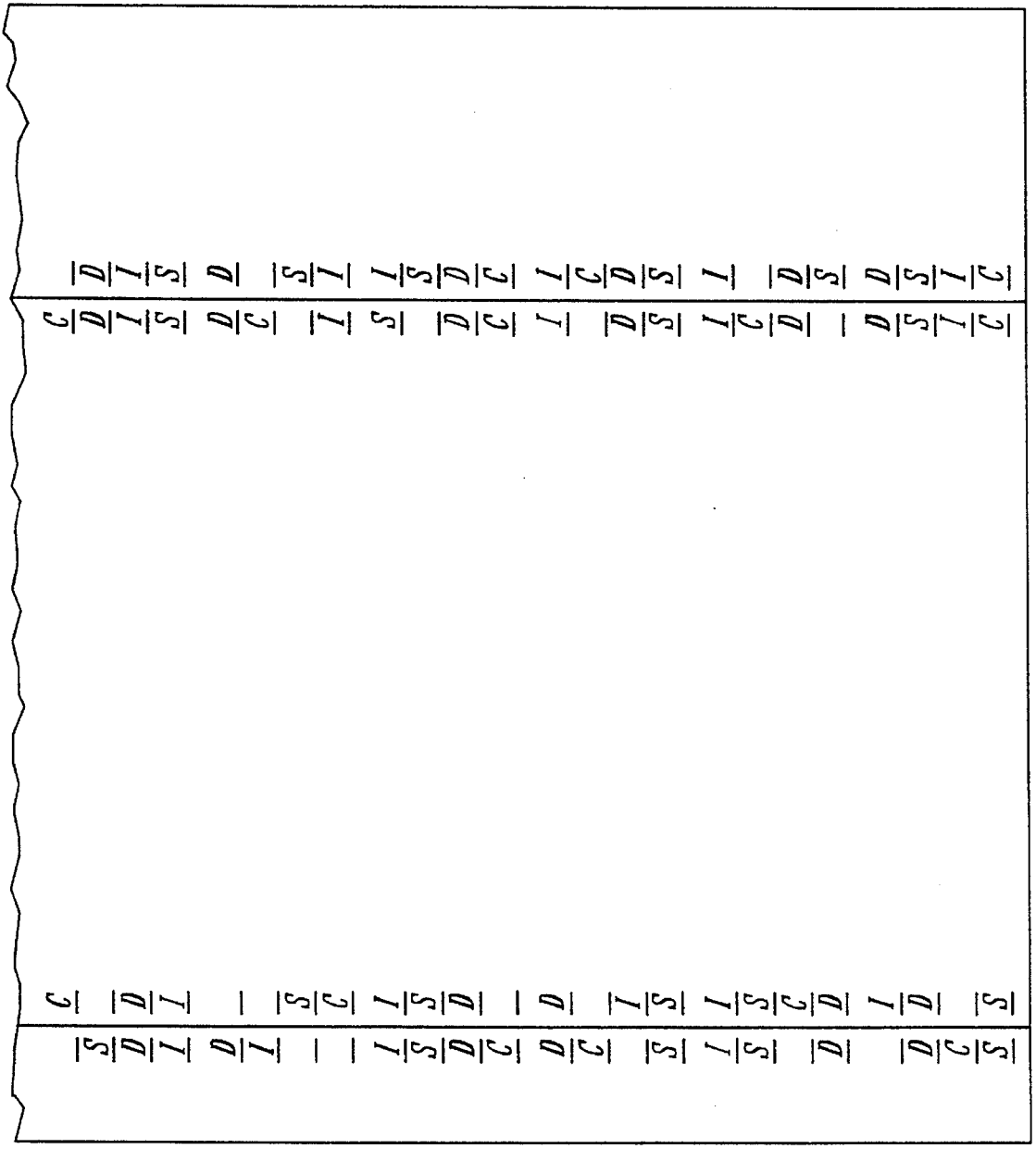

FIGS. 3A–3C and 4 illustrate one way the responses to the questionnaire of FIG. 2 are quantified. FIG. 3A–3C (hereafter collectively "FIG. 3") illustrate that each "most" or "least" answer for each of the twenty-four sets of questionnaire 20 of FIG. 2 is, in a predetermined matter, given a meaning. The "M" and "L" columns of FIG. 3 line up identically with the "M" (standing for "most") and "L" (standing for "least") columns of FIG. 2. If an individual, therefore, checks the "M" column in box 1 of FIG. 2 corresponding to the first row of words (namely "gentle, kindly") that answer would be given an "S" rating in FIG. 3 (the "S" under the left-most "M" column in the first row matches up with the answer given on FIG. 2). If on the other hand, the second row of box 1 in FIG. 2 was checked "M" (with regard to the words "persuasive, convincing"), that response would be given an "I" quantity by matching it on FIG. 3.

A review of FIG. 3 shows that any response to the questionnaire of FIG. 2 for either the most or least columns will have either a "D", "I", "S", "C" or a "blank" meaning assigned to it. Whether the individual fills out a manual work-sheet, or directly enters responses to the questionnaire of FIG. 2 to computer 10, each of his/her answers will be given their appropriate D, I, S, C, or blank designation. It is to be understood that FIGS. 2-4 show a manual worksheet format, for ease of explanation. However the same thing can be accomplished in computer 10 by software 12.

FIG. 4 shows the number of assigned "D's", "I's", "S's", "C"'s, or "blanks" of FIG. 3, for the "M" (most) and "L" (least) columns of a questionnaire of FIG. 2 (filled-out for a hypothetical individual), will be added up separately (see bottom of FIG. 4). Those quantities will then be transposed onto the "most" (graph I) and "least" (graph II) graphs of FIG. 4.

As can be seen in FIG. 4, it is to be noted that graph I represents a summation of the D, I, S, and C responses in the "M" columns of questionnaire FIG. 2. Graph I pertains to "response to environment"; which will be described in more detail below. It represents a quantification of what the individual believes he/she is most like, and presents those in four behavior characteristic categories (D, I, S, C). Graph II is a graphical representation of the total D, I, S, and C responses to the "L" columns of the questionnaire FIG. 2. It represents a quantification of what the person thinks he/she is least like.

It is to be further noted that the graphs of FIG. 4 are vertically numerically scaled for each of D, I, S, and C. Each of the scalings is different and spacing between consecutive numbers is not equal. Further, scaled numbers on graph I increase from bottom to top, but decrease from bottom to top in graph II.

D, I, S, and C, stand for the following behavioral areas; dominance, influence, steadiness, and compliance. These areas are also explored in the Marsten "Emotions of Normal People" book. The present invention, by utilizing the specific questionnaire of FIG. 2, and based on an evaluation of those responses in light of the Marsten materials, results in characterizing the questionnaire responses into graphs I and II of FIG. 4. Quantification of behavior in those four areas is therefore produced, both numerically and, if desired, graphically. The results can also be stored into computer 10 for further processing as will discussed further below. It is again to be understood, however, that the software 12 could automatically corrollate the responses to questionnaire 20 of FIG. 2 into the graphs I and II of FIG. 4.

E. Values Questionnaire

Somewhat similarly to the behavioral questionnaire, FIGS. 5A–5C (hereafter collectively "FIG. 5") illustrates a values questionnaire 22 according to the preferred embodiment of the invention. It differs from behavior questionnaire 20 in that it presents twelve questions or stimuli to the individual. The individual is to rank each of the six choices under each question from 1-6; 1 being first choice, 2 being second choice, etc.

Again, the questionnaire of FIG. 5 could be filled out manually by an individual and the results then input into computer 10, or each of the questions and the choices could be displayed to the individual and the individual can directly enter the rankings for each question into the computer.

Figure 6:
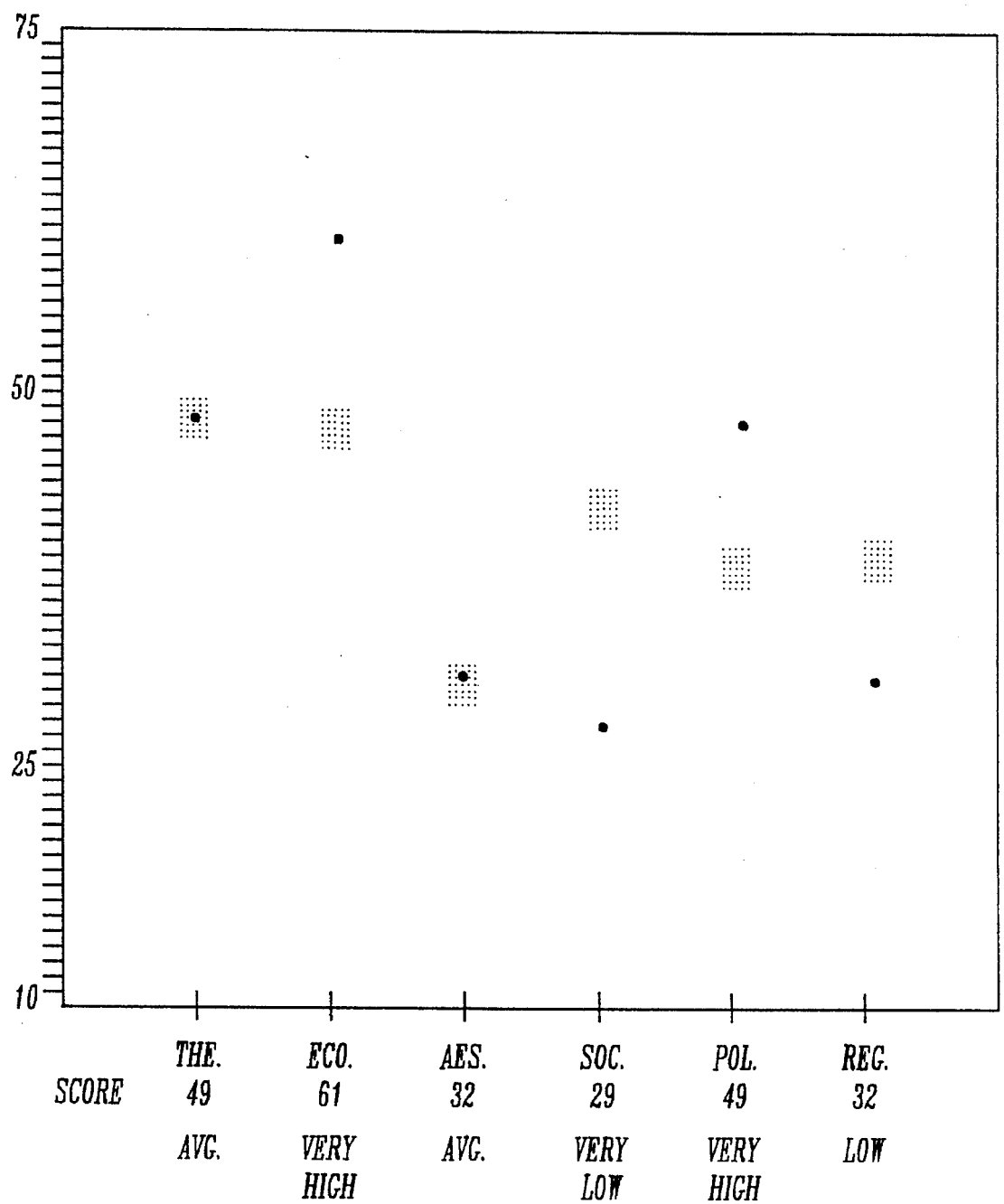
FIG. 6 is a reproduction of a graphical result that can be used with the values questionnaire of FIGS. 5A and 5B.

FIG. 6 shows how the responses to questionnaire 22 of FIG. 5 are quantified. The graph of FIG. 6 breaks the responses to the values questionnaire of FIG. 5 into six values areas:

1. Theoretical,
2. Economic,
3. Aesthetic,
4. Political,
5. Social, and
6. Regulatory.

These areas and categories are derived from Edward Spranger, "Types of Men", book published in 1928. By utilizing predetermined correlative relationships between the answers to the questionnaire of FIG. 5, the individual's values responses are then numerically ranked as shown on FIG. 6. In this particular instance, the squares on FIG. 6 represent the average for a sampling group, and the dots represent the individual's responses. From this graph, therefore, the individual can be compared to averages. The individual's answers are also rated on a scale of 10–75 (or 0–100), as shown in FIG. 6.

The precise manner in which the answers to the questionnaire of FIG. 5 are converted into the numerical ratings for the six values factors of FIG. 6 is as follows:

Similarly to the behavior questionnaire, each answer to values questionnaire 22 is assigned either a T, E, A, S, P, or R (like the D, I, S, or C's regarding FIG. 2). The T, E, A, S, P, and R stand for theoretical, economic, aesthetic, social, politic, and regulatory values factors. In FIGS. 5B and 5C, for purposes of understanding, the T, E, A, S, P, or R assigned to each blank for each question is shown in the dashed vertical boxes. These letters will not be on questions 22 or displayed on the computer screen. Therefore, as an example, if an individual ranks the choices of question 1 of the values questionnaire of FIG. 5 as follows:

<u>3</u> Math/Science

<u>1</u> Political Science

<u>6</u> Theology

<u>5</u> Fine Arts

<u>2</u> Financial Plan Planning

<u>4</u> Social Studies

An P, T, R, S, E, or A would be assigned to each in order; e.g. an "P" for "math/science", an "T" for "political science", etc. These correlations can be stored in lookup tables in computer 10. However, the applicant has ranked each 1 to 6 in order of importance. Therefore, the actual numerical quantities assigned are reversed. A "1" on the questionnaire would be given 6 points. A "6" would be given 1 point and so on.

Therefore, in our example, for question 1 of the values questionnaire, P=4 points, T=6, R=1 , S=2, E=5, and A=3.

This same scoring procedure would be applied to the other eleven questions. Then the scores for all the T's, E's, A's, S's, P's, and R's (12 each) would be added. The results would then be displayed on the graph of FIG. 6. The scale is 10 to 75 points because if the same letter (e.g. T) received a "1" (maximum) ranking on each question, it would have a cumulative score of 6×12=72. If it received a "6" ranking by the individual on each question, its cumulative score would be 1×12=12. The computer, though, for convenience uses a 0–100 scale for these scores.

F. Specific Factor Analysis

Figure 7A:
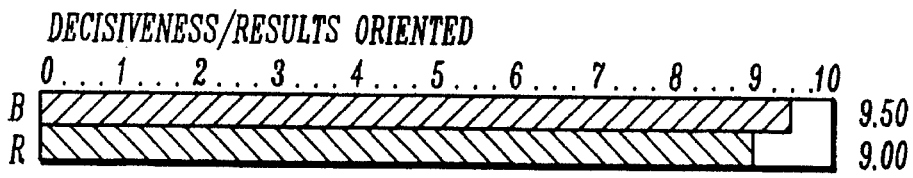
FIGS. 7A–7L are a reproduction of a graphic report regarding merged behavioral and values factors based on the behavioral and values questionnaires of FIGS. 2A–2C and 5A–5C.
Figure 7B:
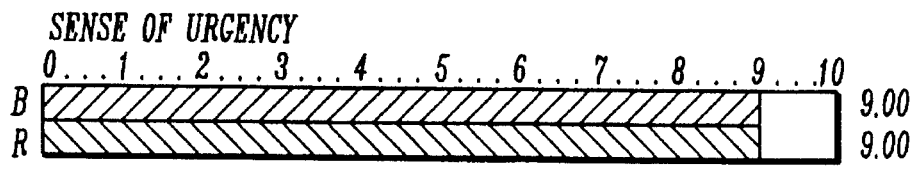
Figure 7C:
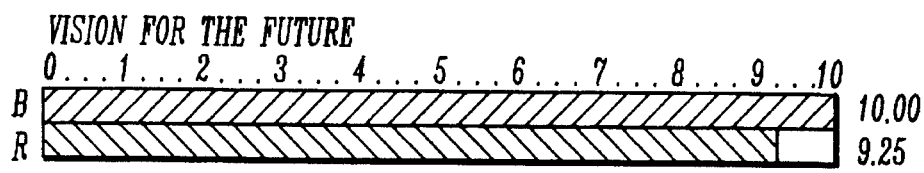
Figure 7D:
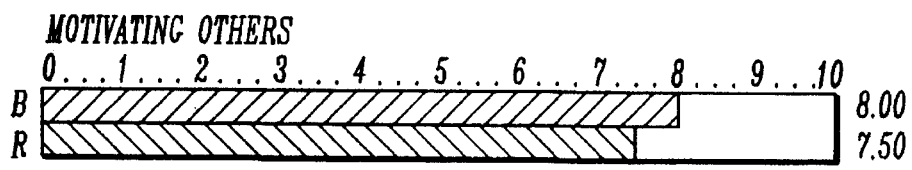
Figure 7E:
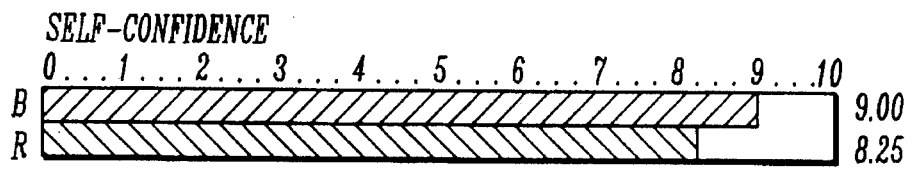
Figure 7F:
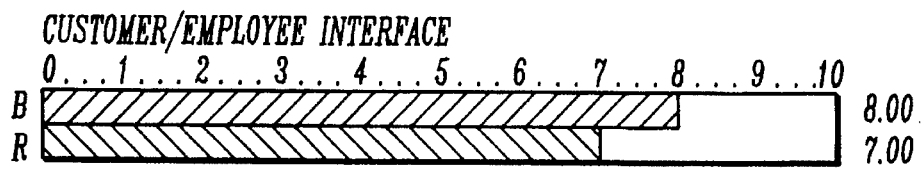
Figure 7G:
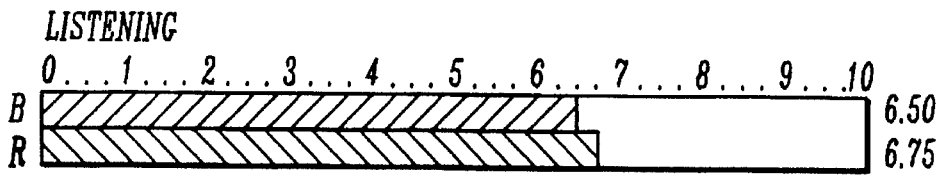
Figure 7H:
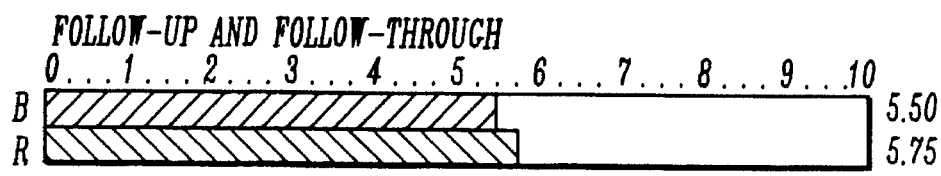
Figure 7I:
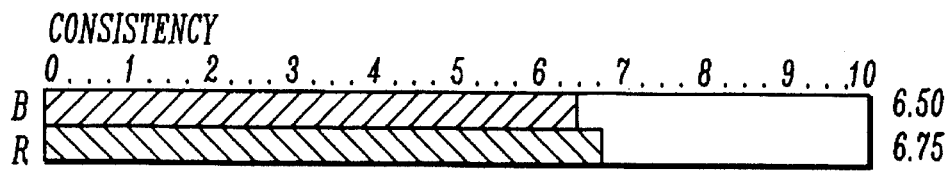
Figure 7J:
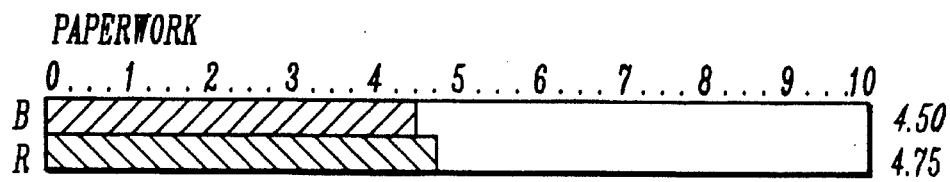
Figure 7K:
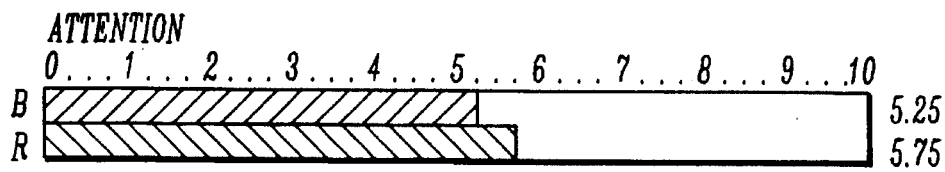
Figure 7L:
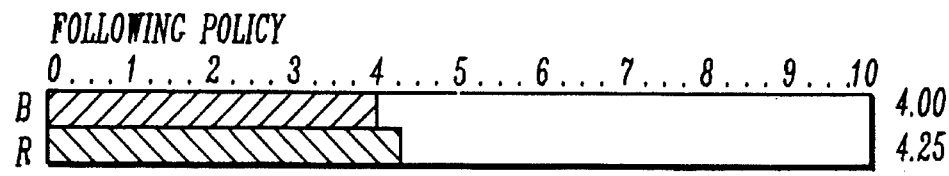
Figure 8A:
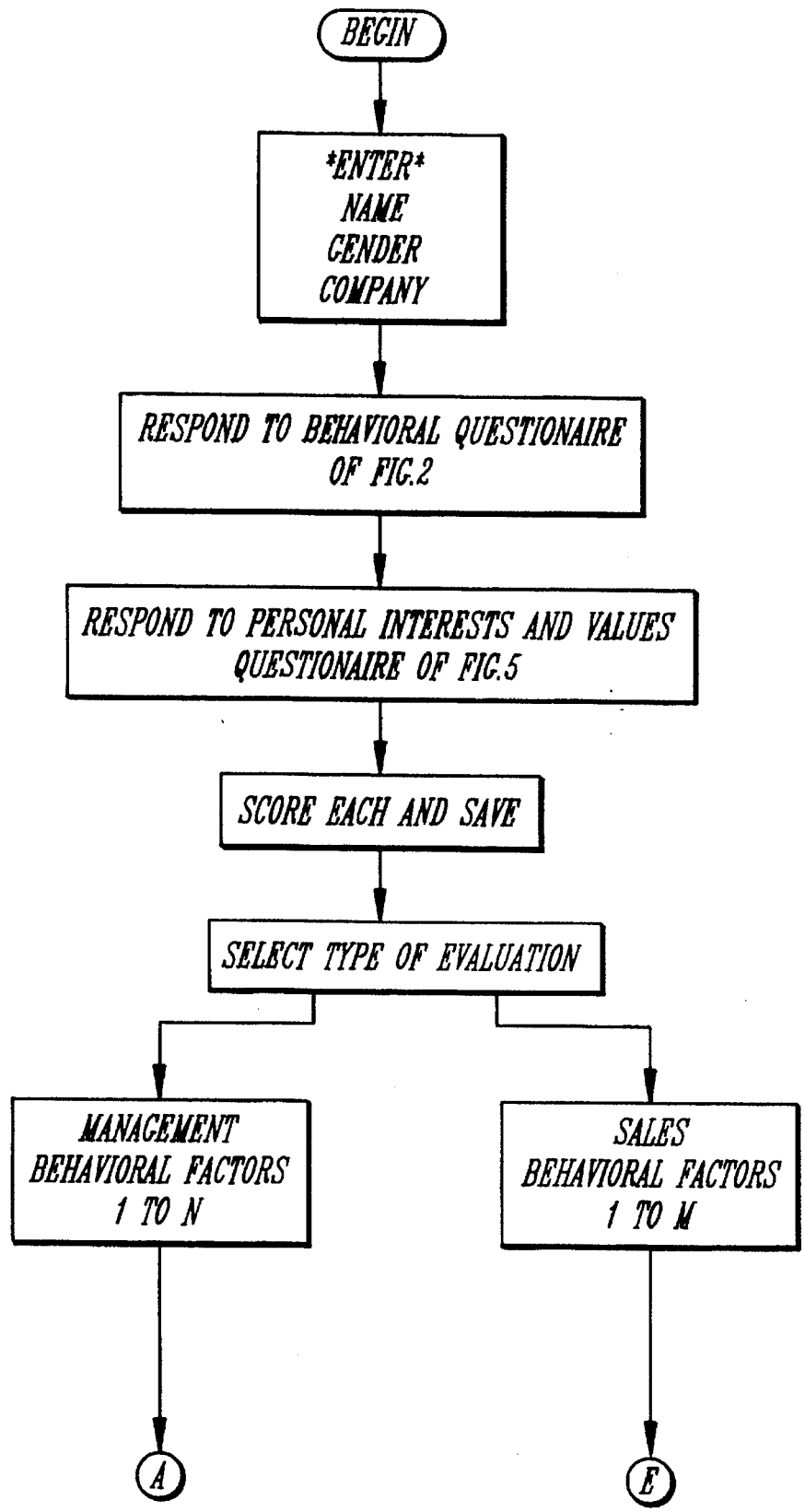
FIG. 8A–8G is a flow chart of software programming utilized with the preferred embodiment of the present invention.
Figure 8B:
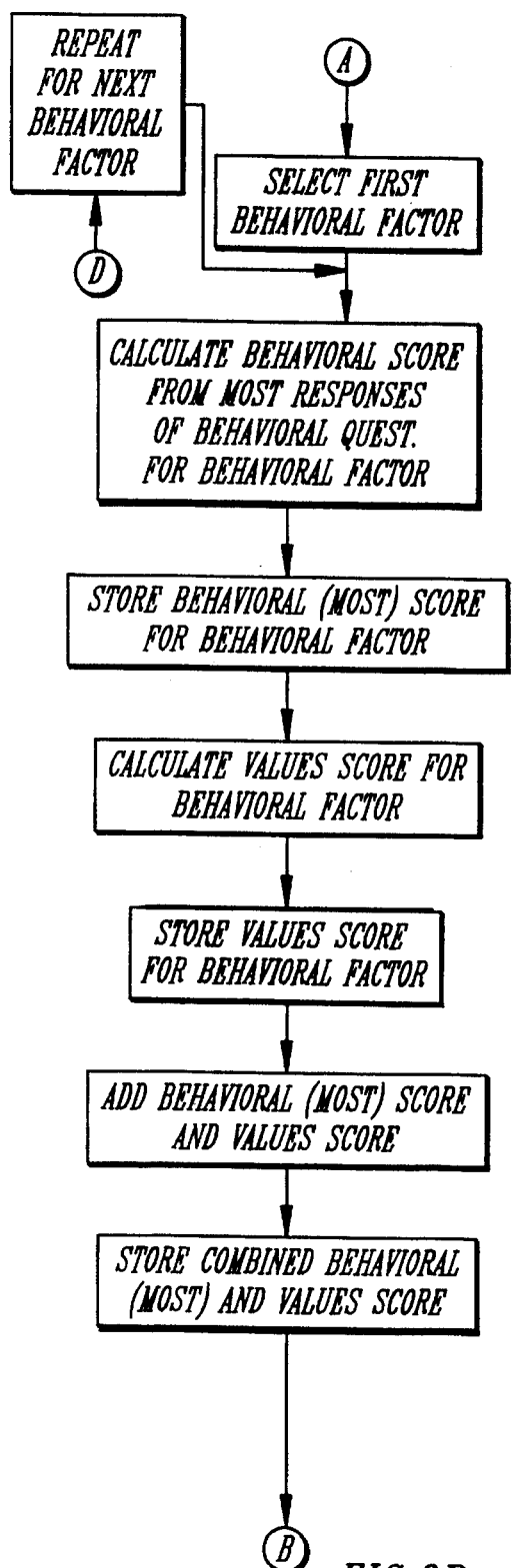
Figure 8C:
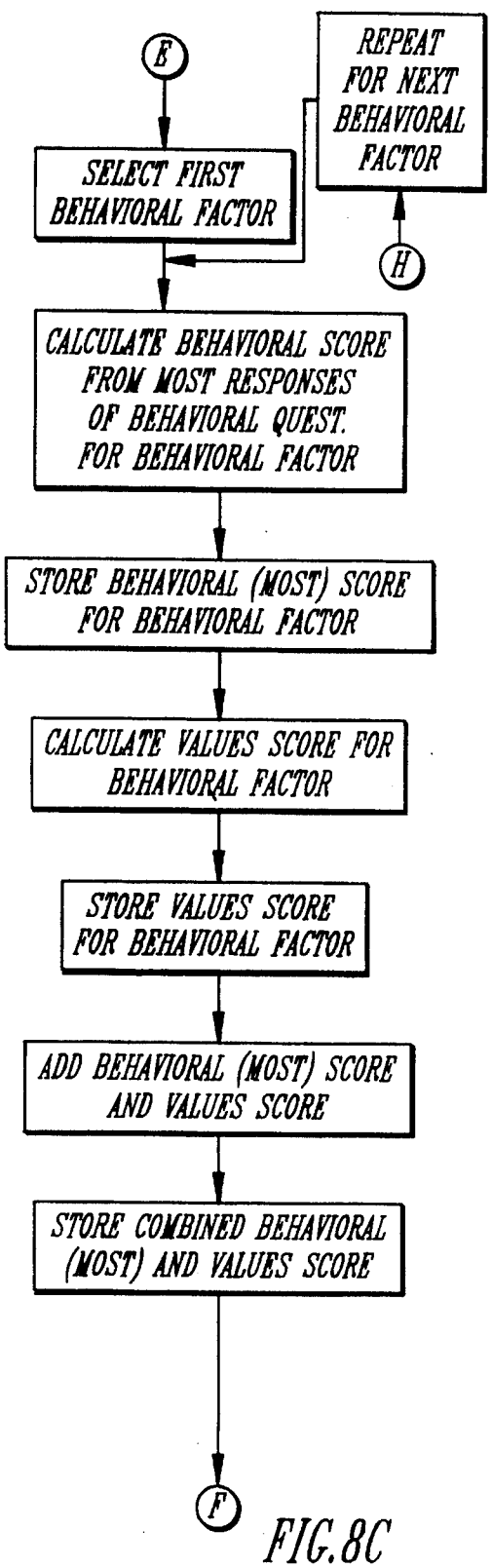
Figure 8D:
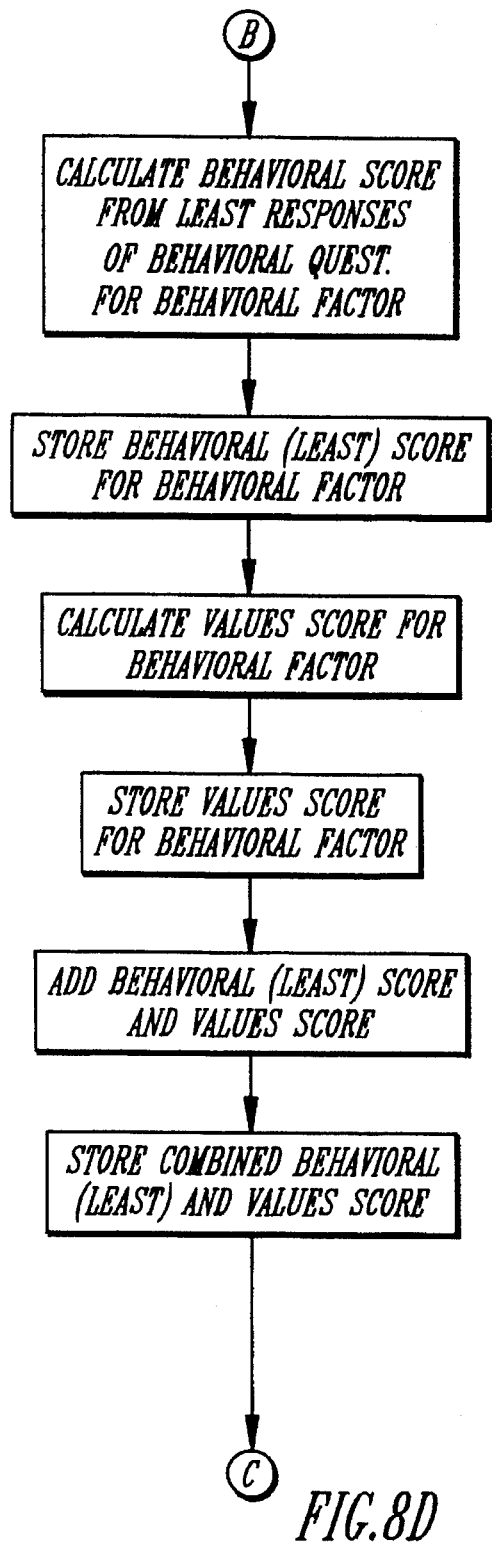
Figure 8E:
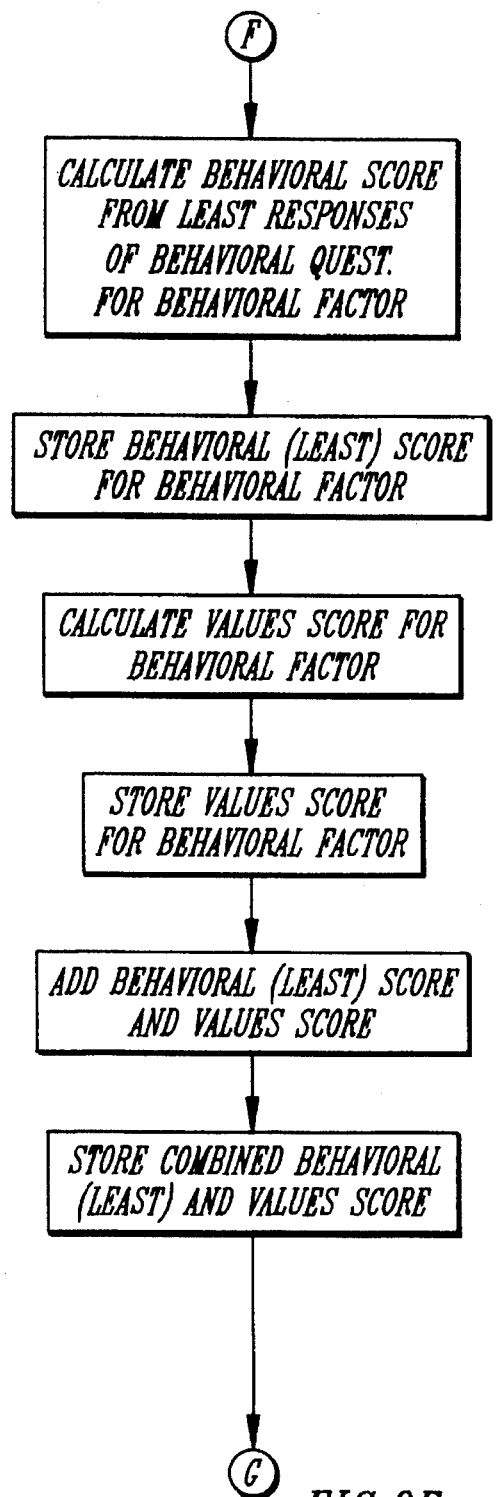
Figure 8F:
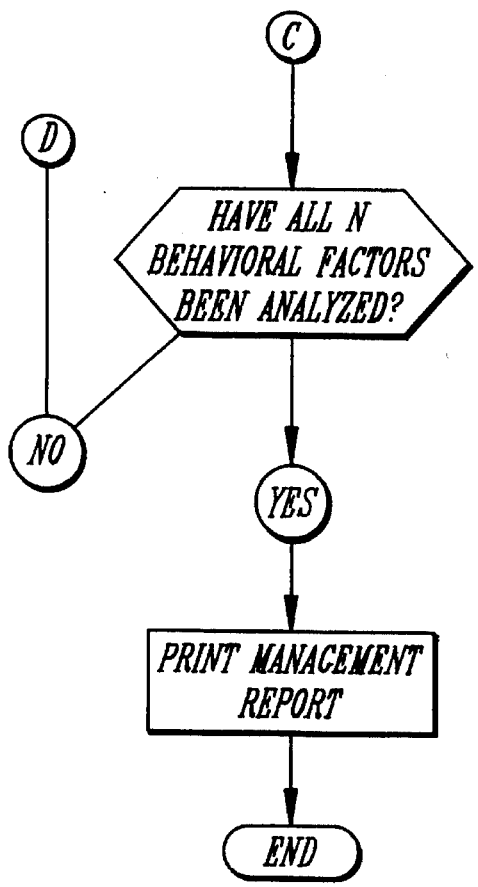
Figure 8G:
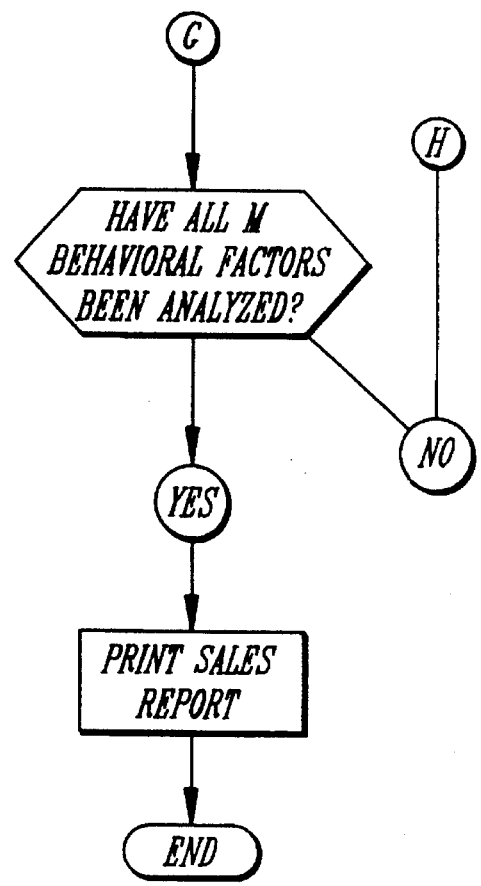

To move from the quantitative values of FIGS. 4 and 6 to a report that merges the quantitation of behavior and values, certain preestablished steps are utilized. They are summarized below:

FIGS. 7A and 7B illustrate a preferred embodiment of what will be called the "specific factor analysis" or "output report" for the system (see 28 at FIG. 1). FIGS. 7A and 7B show the output report for a management job analysis for an individual. As can be seen, twelve separate behavioral factors are set forth with horizontal graphs underneath each factor. Each of the twelve behavioral factors are selected specifically for the particular job; in this case a "management" job. Beginning with the factor "decisiveness/result oriented" and ending with the factor "following policy", a correlated graph is set forth having a 1–10 scale for each. Ten is considered a perfect behavioral score for the particular behavioral factor. Each graph has a top horizontal bar labeled "B" and a bottom bar labeled "R". These are related to graph I "response to environment" of FIG. 4 [the "R"] and graph II (basic style) [the "B"] of FIG. 4. The "B" bar is a visual representation of the individual's natural behavior for that particular management related behavioral factor. The "R" bar represents the individual's perception of what level of behavior is appropriate for the specific job related factor for this specific management job.

Each of the graphs represents not only a quantification of the results of behavior set forth in the behavior graph of FIG. 4, but also merges in the results of the values graph of FIG. 6. A specific example is set forth to aid in understanding of how this occurs.

1. Zoning of Behavior and Values

The graphs of FIG. 4 and 6 quantitatively set forth the individual's answers correlated to four categories (DISC) for behavior and six categories (theoretical or T, economical or E, aesthetic or A, social or S, political or P, regulatory or R) for values. The results for each of the four and six areas is numerically plotted on the graphs of FIGS. 4 and 6. To convert those graphical results into the graphs of FIGS. 7A and 7B, those results must be normalized to the 10 point scales of FIGS. 7A and 7B.

With regard to the behavior graphs I and II of FIG. 4, each of the vertically numbered scales for D, I, S, and C are broken down into ten zones. Below are the zones 1, 2, 3, . . . 10 for each of the D, I, S, and C vertical scales relative to graphs II and I respectively of FIG. 4. The BD zones 1, 2, 3, . . . 10 correspond to the "D" vertical scale of graph II; the BI zones 1, 2, 3, . . . 10 to the "I" scale, graph II; the BS zones relate to "S"; the BC zones relate to "C". Likewise "RD zone", "RI zone", "RS zone" and "RC zone" tables are set forth below regarding zoning of graph I. The zones 1, 2, 3, . . . 10 are on the right side of each table, and the scaled values from graph I or II are on the left side of each table.

```
{----------------------------------------------------------------}
FUNCTION BDzone(Value:byte):byte;
begin
    case Value of
        0           : BDzone:=1;
        1           : BDzone:=2;
        2           : BDzone:=3;
        3           : BDzone:=4;
        4 . . . 5   : BDzone:=5;
        6 . . . 7   : BDzone:=6;
        8 . . . 9   : BDzone:=7;
        10 . . . 12 : BDzone:=8;
        13 . . . 14 : BDzone:=9;
        15 . . . 24 : BDzone:=10;
    end;
end;
{----------------------------------------------------------------}
FUNCTION BIzone(Value:byte):byte;
begin
    case Value of
        0           : BIzone:=1;
        1           : BIzone:=2;
        2           : BIzone:=3;
        3           : BIzone:=4;
        4           : BIzone:=5;
        5           : BIzone:=6;
        6           : BIzone:=7;
        7 . . . 8   : BIzone:=8;
        9           : BIzone:=9;
        10 . . . 24 : BIzone:=10;
    end;
end;
{----------------------------------------------------------------}
FUNCTION BSzone(Value:byte):byte;
begin
    case Value of
        0 . . . 1   : BSzone:=1;
        2           : BSzone:=2;
        3           : BSzone:=3;
        4           : BSzone:=4;
        5 . . . 6   : BSzone:=5;
        7           : BSzone:=6;
    end;
end;
{----------------------------------------------------------------}
FUNCTION BCzone(Value:byte):byte;
begin
    case Value of
        0 . . . 1   : BCzone:=1;
        2           : BCzone:=2;
        3           : BCzone:=3;
        4           : BCzone:=4;
        5 . . . 6   : BCzone:=5;
        7           : BCzone:=6;
        8 . . . 9   : BCzone:=7;
        10          : BCzone:=8;
        11          : BCzone:=9;
        12 . . . 24 : BCzone:=10;
    end;
end;
{----------------------------------------------------------------}
FUNCTION RDzone(Value:byte):byte;
begin
    case Value of
        16 . . . 24 : RDzone:=1;
        14 . . . 15 : RDzone:=2;
        11 . . . 13 : RDzone:=3;
        9 . . . 10  : RDzone:=4;
        7 . . . 8   : RDzone:=5;
        5 . . . 6   : RDzone:=6;
        3 . . . 4   : RDzone:=7;
        2           : RDzone:=8;
        1           : RDzone:=9;
        0           : RDzone:=10;
    end;
end;
{----------------------------------------------------------------}
FUNCTION RIzone(Value:byte):byte;
begin
    case Value of
        10 . . . 24 : RIzone:=1;
        8 . . . 9   : RIzone:=2;
        7           ; RIzone:=3;
        5 . . . 6   : RIzone:=4;
        4           : RIzone:=5;
        3           : RIzone:=6;
        2           : RIzone:=7;
        1           : RIzone:=9;
        0           RIzone:=10;
    end;
end;
```

```
{------------------------------------------------------------------}
FUNCTION RSzone(Value:byte):byte;
begin
    case Value of
        12 . . . 24    : RSzone:=1;
        10 . . . 11    : RSzone:=2;
        9              RSzone:=3;
        7 . . . 8      : RSzone:=4;
        5 . . . 6      : RSzone:=5;
        4              : RSzone:=6;
        3              : RSzone:=7;
        2              : RSzone:=8;
        0 . . . 1      : RSzone:=9;
    end;
end;
{------------------------------------------------------------------}
FUNCTION RCzone(Value:byte):byte;
begin
    case Value of
        9 . . . 24     : RCzone:=1;
        8              : RCzone:=2;
        7              : RCzone:=3;
        5 . . . 6      : RCzone:=4;
        4              : RCzone:=5;
        3              : RCzone:=7;
        2              : RCzone:=8;
        1              : RCzone:=9;
        0              : RCzone:=10;
    end;
end;
END.
```

It should be noted that separate zones are established for both graph I and II. As an example, please refer to graph I of FIG. 4. The "D" column has a value of "10". By looking to the zoning chart having RD zones 1, 2, 3, . . . 10, the "10" falls in the range "9 . . . 10" opposite "RD zone:=4" therefore that "10" value will be converted into "4" on a 10 point scale. In comparison, the "3" value under "I" of graph I of FIG. 4 would convert to a "RI zone" rating of "6".

The zone ratings of graphs I and II of FIG. 4 would then convert as follows:

| DISC | GRAPH I RATING | R ZONE RATING | GRAPH II RATING | B ZONE RATING |
|------|----------------|---------------|-----------------|---------------|
| D    | 10             | 4             | 1               | 2             |
| I    | 3              | 6             | 1               | 2             |
| S    | 0              | 9             | 10              | 8             |
| C    | 1              | 9             | 10              | 8             |

The value ratings of the values graph of FIG. 6 are similarly zoned. Below are reproduced the numerical quantities of FIG. 6 and the corresponding range ratings or zone ratings for those numerical quantities for each of the six values categories (T, E, A, S, P, R): [Note that the five zones for the graph of FIG. 6 are defined as "Range:=Very High", "Range:=High", "Range:=Low", "Range:=Very Low". Each of those Range:=Average , descriptions are assigned the numerical values Very High=1, High=2 . . . Very Low=5.]

```
{------------------------------------------------------------------}
FUNCTION GetValueRange(WhichValue:byte):byte;
CONST
    VeryHigh    = 1;
    High        = 2;
    Average     = 3;
    Low         = 4;
    VeryLow     = 5;
VAR
    Range : byte;
begin
    with gCurrentPerson.
    1 : case TV of
            58 . . . 99 : Range:=VeryHigh;
            51 . . . 57 : Range:=High;
            48 . . . 50 : Range:=Average;
            41 . . . 47 : Range:=Low;
             0 . . . 40 : Range:=VeryLow;
        end;
    2 : case EV of
            59 . . . 99 : Range:=VeryHigh;
            51 . . . 58 : Range:=High;
            47 . . . 50 : Range:=Average;
            37 . . . 46 : Range:=Low;
             0 . . . 36 : Range:=VeryLow;
        end;
    3 : case AV of
            43 . . . 99 : Range:=VeryHigh;
            34 . . . 42 : Range:=High;
            30 . . . 33 : Range:=Average;
            20 . . . 29 : Range:=Low;
             0 . . . 19 : Range:=VeryLow;
        end;
    4 : case SV of
            54 . . . 99 : Range:=VeryHigh;
            46 . . . 53 : Range:=High;
            42 . . . 45 : Range:=Average;
            33 . . . 41 : Range:=Low;
             0 . . . 32 : Range:=VeryLow;
        end;
    5 : case PV of
            48 . . . 99 : Range:=VeryHigh;
            42 . . . 47 : Range:=High;
            38 . . . 41 : Range:=Average;
            30 . . . 37 : Range:=Low;
             0 . . . 29 : Range:=VeryLow;
        end;
    6 : case RV of
            48 . . . 99 : Range:=VeryHigh;
            41 . . . 47 : Range:=High;
            38 . . . 40 : Range:=Average;
            30 . . . 37 : Range:=Low;
             0 . . . 29 : Range:=VeryLow;
        end;
    end;
    GetValueRange:=Range;
end;
END.
```

In the example of FIG. 6, the ratings on a scale of 0–100 would be converted to zoned ratings between 1–5 as follows:

| VALUES CATEGORIES | FIG. 6 GRAPH RATING | VALUE RANGE ZONE RATING |
|-------------------|---------------------|-------------------------|
| theoretical (T)   | 49                  | average (3)             |
| economics (E)     | 61                  | very high (1)           |
| aesthetic (A)     | 32                  | average (3)             |
| social (S)        | 29                  | very low (5)            |
| political (P)     | 49                  | very high (1)           |
| regulatory (R)    | 32                  | low (4)                 |

2. Lookup Tables

Once general behavior in the four categories of D, I, S, C are converted to a 1–10 scale value by the zoning process, and values in the six categories T, E, A, S, P, R, are converted to the 1–5 scale by the zoning process, the specific graphs of FIG. 7A and 7B can be created. This is accomplished by the following steps.

Each of the twelve management behavioral factors of FIGS. 7A and 7B will have one lookup table for basic behavior "B" and responsive behavior "R", and one lookup table for "values". Each B and R lookup table will consist of an 10×4 array of numerical values which have been preselected based on an understanding of how the behaviors and values plotted on FIGS. 4 and 7 relate to the specific behavior factors of FIGS. 7A and 7B. Each lookup table for values is a 5×6 array. Below are reproduced the two sets of twelve lookup tables for management analysis:

```
                    (B) AND (R) LOOKUP TABLES FOR
                   TWELVE MANAGEMENT BEHAVIOR FACTORS
                              TYPE
    LookupTableType = and [1 . . . MaxTables,1 . . . 4,1 . . . 10 . . . =byte;
    ValuesLookupTableType = array[1 . . . MaxTables,1 . . . 6, .5) of byte;
CONST
    LookupTABLE : LookupTableType =
       { DECISIVENESS/RESULTS ORIENTED }
          (((10,10,9,8,6,5,4,3,2,2),
             (9,9,9,8,7,5,4,4,2,2),
             (2,3,4,4,5,5,8,10,10,10),
             (2,3,4,4,5,5,7,9,10,10)),
       { SENSE OF URGENCY }
          ((10,10,10,8,7,5,4,3,3,2),
             (8,8,8,9,10,9,7,5,3,2),
             (2,3,4,4,5,8,10,10,10,10),
             (2,3,4,4,5,6,8,10,10,10)),
       { VISION FOR THE FUTURE }
          ((10,10,10,9,8,6,5,4,3,2),
             (10,10,10,9,8,5,4,3,2,2),
             (2,3,4,5 6,7,8,10,10,10),
             (2,3,4,5,6,8,9,10,10,10)),
       { MOTIVATING OTHERS }
             (8,9,10,10,8,6,4,3,3,2
             (9,10,10,9,8,6,4,3,3,2),
             (2,3,4,4,5,6,8,10,10,9),
             (2,3,4,4,5,6,8,10,919)),
       { SELF-CONFIDENCE }
          ((10,10,9,8,7,5,4,3,3,2),
             (8,9,7,5,5,4,4,3,3,2),
             (2,3,4,5,5,7,8,9,10,10),
             (2,3,3,4,5,6,7,10,10,10)),
       { CUSTOMER/EMPLOYEE INTERFACE }
          ((7,8,8,8,7,7,7,10,10,10),
             (10,10,8,7,6,5,4,4,3,2),
             (10,10,9,8,7,6,8,8,7,7),
             (8,8,7,7,6,6,6,5,4,2)),
       { LISTENING }
          ((3,4,4,5,5,6,7,10,10,10),
             (2,3,4,5,5,6,7,9,10,10),
             (10,10,9,8,6,5,4,4,3,2),
             (10,10,9,8,7,6,5,4,3,2)),
       { FOLLOW-UP }
          ((4,5,5,5,6,7,8,9,10,10),
             (3,4,4,5,,5,6,8,10,10,9),
             (16,10,9,8,7,6,5,4,4,3),
             (8,10,9,8,7,6,5,4,4,3)),
       { CONSISTENCY }
          ((4,4,4,4,5,7,8,10,10,10),
             (3,3,4,4,5,6,8,9,10,10),
             (10,10,8,7,6,5,4,3,3,2),
             (10,10,9,8,7,6,5,4,3,2)),
       { PAPERWORK }
          ((3,4,5,5,5,6,7,10,10,10),
             (2,3,4,5,5,6,8,9,10,10),
             (10,10,9,8,6,5,4,4,3,2),
             (10,10,9,8,6,6,5,4,3,2)),
       { ATTENTION TO DETAIL }
          ((2,3,4,5,6,7,8,10,10,10),
             (2,3,4,5,6,7,8,10,10,10),
             (10,10,10,8,7,5,4,3,2,2),
             (10,10,10,9,9,8,6,4,3,2)),
       { FOLLOWING POLICY }
          ((2,3,4,4,5,7,9,10,10,10),
             (2,3,4,4,5,7,9,10,10,10),
             (10,10,9,9,8,6,5,4,3,2),
             (10,10,10,9,8,6,5,4,2,2)));
             VALUES LOOKUP TABLE FOR TWELVE MANAGEMENT FACTORS
    ValuesLookupTABLE : ValuesLookupTableType
       { DECISIVENESS/RESULTS ORIENTED }
          (((2,255,255,255,255),
             (10,10,6,4,2),
             (10,10,6,255,255),
             (2,4,6,10,10),
             (10,10,6,4,2),
             (2,4,6,8,10)),
       { SENSE OF URGENCY }
```

```
            ((2,4,255,255,255),
             (10,10,6,4,2),
             (2,6,10,10,10),
             (2,6,255,255,255),
             (10,10,8,4,2),
             (2,255,255,255,255)),
          { VISION FOR THE FUTURE }
            ((4,255,255,255,255),
             (10,10,8,4,2),
             (4,255,255,255,255),
             (2,4,6,10,10),
             (10,10,8,4,2),
             (2,4,8,10,10)),
          { MOTIVATING OTHERS }
            ((4,6,8,10,6),
             (10,10,6,4,2),
             (8,10,6,4,2),
             (10,10,8,8,4),
             (4,10,8,4,2),
             (4,6,255,255,255)),
          { SELF-CONFIDENCE }
            ((255,255,255,255,255),
             (10,10,6,4,2),
             (8,10,6,4,2),
             (2,4,6,10,10),
             (10,10,6,4,2),
             (255,255,255,255,255)),
          { CUSTOMER/EMPLOYEE INTERFACE }
            ((2,255,255,255,255),
             (8,10,6,255,255),
             (2,255,255,255,255),
             (10,10,6,255,2),
             (6,255,255,255,255),
             (2,6,8,255,255)),
          { LISTENING }
            ((10,10,6,4,2),
             (10,10,6,255,255),
             (10,10,6,255,255),
             (6,10,6,255,2),
             (8,10,6,10,8),
             (2,4,6,255,255)),
          { FOLLOW-UP }
            ((2,255,255,255,2),
             (10,10,6,4,2),
             (255,255,255,255,255),
             (10,10,6,4,2),
             (6,8,6,4,2),
             (255,255,255,255,255)),
          { CONSISTENCY }
            ((10,10,255,255,255),
             (6,10,6,4,2),
             (255,255,255,255,255),
             (255,255,255,255,255),
             (8,10,6,4,2),
             (10,10,6,255,6)),
          { PAPERWORK }
            ((10,10,6,4,2),
             (255,255,255,255,255),
             (8,10,6,255,255),
             (255,255,255,255,255),
             (2,4,6,8,10),
             (8,10,6,4,2)),
          { ATTENTION TO DETAIL }
            ((10,10,8,6,4),
             (255,255,255,255,255),
             (10,10,6,4,2),
             (255,255,255,255,255),
             (8,10,255,255,255),
             (10,10,8,6,2)),
          { FOLLOWING POLICY }
            ((255,255,255,255,255),
             (4,6,8,255,255),
             (255,255,255,255,255),
             (10,8,6,4,2),
             (4,6,8,10,10),
             (10,10,8,4,2)
{--------------------------------------------------------------------------}
PROCEDURE CalcBStyle_Management(BD,BI,BS,BC:byte; VAR Values:AvgsType);
VAR i:byte;
    BD:=BDzone(BD);
```

```
    BI:=BIzone(BI);
    BS:=BSzone(BS);
    BC:=BCzone(BC);
    fillchar(Values,sizeof(Values),0);
    for i:=1 to MaxTables do
        Values[i]:=(LookupTable[i,1,BD]+LookupTable[i,2,BI]+
                LookupTable[i,3,BS]+LookupTable[i,4,BC])
                / 4
                {$IFDEF SPIPROGY}
                / 2
                {($ENDIF};
end;
{--------------------------------------------------------------------------------------------------------------------}
```

It can be seen that the arrays for the B and R behavior tables are ten columns by four rows which matches up with the ten zones (columns) and the D, I, S, C (rows) previously discussed.

The values lookup tables, similarly, comprise five column by six row matrices. The rows correspond with the six values factors (theoretical, economic, aesthetic, social, political, and regulatory) and the columns correspond to the five zones described above regarding values.

3. Formulas

The zoned numerical values of D, I, S, and C, for behavior for graph I and II are then "looked up" in the lookup tables. For example, "D" of graph I, having a zoned value of "4" (from zone tables) would be given a rating of "8" for the "decisiveness/results orientated" factor for management by looking at the lookup table position for behavior under the row correlated to "D" (row one) and the column correlated to zone four (column 4). The "D" of graph II, having a zoned rating of "2" would therefore be given a rating of "10" under the "decisiveness/results orientated" lookup table for behavior by referring to the first row, second column.

Similar lookups would occur for the I, S, and C of both graphs I and II for the decisiveness/results orientated category. All of these numerical ratings would then be stored.

The software would then find the lookup table ratings for D, I, S, C for graphs I and II for each of the remaining eleven behavioral factors for management. These ratings would also then be stored.

There would be four ratings between one and ten for both "B" and "R" for each of the twelve behavioral factors.

The four ratings for "B" would be added together and the four ratings for "R" would be added together and each sum divided by four to create an average for "B" and "R" that is on a one to ten scale. These averages are then divided again by 2, to create averages for "B" and "R" on a five point scale. This is the precursor for the final numerical quantities for "B" and "R" shown in FIG. 7A and 7B.

These quantities represent behavior only. To add and merge to the individual's value profile results into each of these quantities, the following steps are taken. The zoned rating for value (as opposed to behavior "B" or "R") for each of the twelve behavioral categories is similarly calculated. The theoretical rating of 49 in FIG. 6 for "decisiveness/ results oriented" would be calculated by zoning the "49" in the values zone tables. It falls in the range "48". . . 50" for the "TV" (meaning Theoretical Value) zone table—which is assigned an "Average" description. "Average" translates to a "3" zone numerical rating. Then going to the value lookup table related to decisiveness/results oriented, row 1 (relating to theoretical) and column 3 (which relates to the zone rating of three given to the 49 theoretical score are selected). In this instance the value would be "255". As another example, the 61 rating for economics in FIG. 6 falls in the "very high" zone of zone table EV (for "economics"), is given a "1" numerical zone rating, and would translate in the value lookup table (for decisiveness/results oriented) to the number "10" by looking to row 2 (for the 2nd value factor-economics), column 1 (61 translated to a zoned 1).

The same analysis would be done for each of the six values categories of FIG. 6 for each of the twelve behavioral factors of FIGS. 7A and 7B.

In some instances, not all value factors should affect the behavioral rating of FIGS. 7A and 7B. This is accomplished by utilizing the number "255" in the lookup tables. If a values zoned rating translates into a lookup table "255", it is to be disregarded. Therefore, only the non-"255" lookup table numbers would be selected and added together. They would then be divided by the number of different values factors utilized to a converted point scale, and then that number would be divided by two to bring the values factor to a 5 point scale. For example, if only four non-"255" numbers match up from a values lookup table for a given behavior factor, the sum of those numbers would be divided by four and then by two to get an average on a five point scale. If no non-"255" numbers match up, the system assigns a "5" numerical quantity, which essentially means that the individual's values do not affect that particular behavior factor.

The corresponding values 5 point scale rating would then be added to the "B" and "R" 5 point scale ratings for each of the twelve management factors, so that behavior and values would basically be rated on approximately a 50/50 basis in coming to the merged final 10 point scale value for both "B" and "R" for each of the twelve behavior factor categories of FIGS. 7A and 7B.

Therefore, by this correlation, the results of FIGS. 7A and 7B can be created. Each of the twelve management behavior factors, as reflected for both behavior and values, are graphed. Again the "B" bar represents the basic or actual behavior/values characteristic of the individual; the "R" bar represents the response to environment or perception of the individual as to what sort of behavior/value is indicated for the job.

In FIGS. 7A and 7B, therefore, it can be seen that this individual has very good basic response (9.5 "B" bar graph) and that-his/her basic response is actually better than his/her perception of what type of decisiveness/results oriented behavior is required for the management job (9.0 "R" bar graph).

A review of the sense of urgency graphs of FIG. 7A indicates that both the basic (B) and perceived (R) behavior for the individual are equivalent and quite high (9.0) for the job. In this example however, the results for "Paperwork" are B=4.50 and R=4.75, which are fairly low. A similar analysis can then be made of the remaining graphs of FIGS. 7A and 7B.

G. Output Reports

FIGS. 7A and 7B along with FIGS. 4 and 6 illustrate specific examples of output reports available in the preferred embodiment of the invention. As previously described, FIG. 4 gives a visual representation of an individual's behavior profile with respect to basic "B" and response to environment "R" characteristics and to a scale that is correlated for a specific job (examples, management or sales). FIG. 6 does the same for values.

FIGS. 7A and 7B, the specific factor analysis reports, break down the responses to the behavior and values questionnaires of FIGS. 2 and 5 into the twelve specific behavior categories that in this instance are related to management. Those categories for behavior, as previously discussed, are:

1. Decisiveness/Result oriented,
2. Sense of urgency,
3. Vision for the future,
4. Motivating others,
5. Self-confidence,
6. Customer/employee interface,
7. Listening,
8. Follow-up and follow-through,
9. Consistency,
10. Paperwork,
11. Attention to detail, and
12. Following policy.

The two horizontal bars, one labeled "B" and one labeled "R", as previously described, relate to different behavioral characteristics found to be important to management jobs. The "B" bar is derived from an analysis of the behavioral questionnaire and represents the individual's natural behavior—the behavior of the individual would bring to the job. The "R" bar represents the individual's response to the particular environment—the behavior of the individual thinks is necessary to succeed at a job. Both the "B" and "R" bars include a weighed "values" portion, so that overall behavior and values are represented in each bar.

H. Software

FIG. 8 illustrates in flow chart form the basic software operation as the invention. The specific programming is within the skill of those of ordinary skill in the art. As discussed previously, the program must be loaded into computer 10. The user can configure the computer 10 so that the software will operate appropriately. For example, the type of monitor (black and white or color), the type of printer, and the type of reports can be pre-selected.

As shown in FIG. 8, the first step would be then to enter identifying information regarding the individual being tested. Name, gender, and company information can be inserted into the computer. In the present example, all this occur by direct entry on the keyboard of computer 10. Alternatively, this information can be filled out on a hardcopy worksheet and then entered into the computer.

FIG. 8 then shows that the individual will then respond to the behavior questionnaire of FIG. 2 and the personal interest and values questionnaire of FIG. 5. Each questionnaire is then scored and the results saved.

Next the user or the individual selects the type of evaluation—in other words the type of job being tested. In the preferred embodiment the choices are either management or sales.

The program then conducts a merging of the results for behavior and values as follows. If management is selected, there are 12 behavioral factors which are scored (see FIGS. 7A and 7B for example). Thus, as shown in FIG. 8, the variable "N" would equal twelve. Those twelve factors have been listed previously. The computer would first calculate overall behavioral score in the far overall behavior categories of D, I, S, and C for basic (B) based on the responses in the "least" columns of the behavioral questionnaire. It would do the same for response (R) from the responses in the "most" columns. These are represented at FIG. 4. Scores for the six overall values categories of T, E, A, S, P, and R are then calculated for the person. (See FIG. 6).

Once the persons generated behavior and values characteristics are scored, they are applied to the particular job (in this example, management). The D, I, S, C overall scores are zoned for "B" and "R" on a ten point scale. The lookup tables are then used to derive B and R ratings for D, I, S, C for the twelve management factors. The D, I, S, C ratings are summed and divided by four to get ten-point scale averages and then divided by two to get a five-point scale averages for B and R.

Next, the program would calculate the values score for that same behavioral factor. The T, E, A, S, P, R overall scores of FIG. 6 are zoned. Those results are used to derive values lookup table ratings for T, E, A, S, P, and R for each of the twelve behavior factors. The ratings are summed and averaged based on how many are used (non-255 entries) to get 5-point scale scores. The program stores the behavioral (most or "R") score and the values score for that particular behavior factor and then adds them together and stores the combined results. As previously described it does the same for the sum of the behavior (least or "B") score and values score.

As shown in FIG. 8, the program repeats and does the same thing for the next behavioral factor. It calculates the "most" responses and "least" responses for the next behavioral factor, adds the value rating to each and stores the result two results.

Finally, after all "N" behavioral factors have been calculated based on the "most" plus values and "least" plus values responses, the program is ready to print a management report in a format selected by the individual or user. The report will have merged quantification of behavioral scores and value scores and set forth a report that can be used to interpret combined behavior and values characteristics with respect to management position for the company.

In contrast, if the sales branch of the program of FIG. 8 is selected, the same process will occur. For each of the "M" sales behavior factors, the "most" and "least" responses of the behavior questionnaire for that behavior factor will be calculated and each will be added to the calculated values score for that behavioral factor. All of these sums will be stored and used to printout a sales report.

Sales has 17 behavioral factors;
1. Preparation,
2. Presentation,
2. Handling objections,
4, Closing,
5. Servicing,
6. Challenge oriented,
7. Self-starter,
8. Results oriented,
9. Prospecting,
10. Persuasion,
11. Self-confidence,
12. Consistency,
13. Natural listening skills,
14. Customer relations, 15. Product information,
16. Follow-up/follow-through, and
17. Paper work.

These have also been selected based on the Marsten work but are particularly keyed into sales jobs or tasks. For purposes of further example, below are reproduced, first, lookup tables for the seventeen behavior factors (listed above) for sales job analysis. These tables are used like those previously described; to get numerical ratings for the "Basic" and "Response" behavioral portions of the horizontal bar graphs like those of FIGS. 7A and 7B.

```
                B AND R LOOKUP TABLES FOR SALES BEHAVIOR
USES ZONES,CALCVAL;
TYPE
    ArrayType = array[1 ... 4,1 ... 10] of byte;
CONST
    MaxTables = 17;
TYPE
    LookupTableType = array[1 ... MaxTables,1 ... 4,1 ... 10] of byte;
    ValuesLookupTableType = array[1 ... MaxTables,1 ... 6,1 ... 5] of byte;
CONST
    LookupTABLE : LookupTableType
        { PREPARATION }
            (((3,4,4,4,5,6,7,9,10,10),
              (3,4,4,4,5,6,8,9,10,9),
              (10,10,9,8,6,5,4,4,3,3),
              (10,10,9,8,6,6,5,5,4,3)),
        { PRESENTATION }
            ((9,10,9,8,7,6,5,4,3,3),
             (9,10,9,8,6,5,5,4,3,3),
             (1,4,5,5,6,7,a,9,10,9),
             (3,4,5,5,6,8,9,10,9);
        { Objections : ArrayType= }
            ((9110,10,9,7,6,5,4,4,3),
             (9,10,9,8,7,5,4,4,4,3),
             (3,4,5,5,5,6,8,10,10,9),
             (3,4,5,5,5,6,8,10,9,8)),
        { closing : ArrayType = }
            ((9,10,10,9,8,6,5,5,4,3),
             (9,10,10,9,7,6,5,5,4,3),
             (3,4,4,5,6,8,10,10,10,9),
             (3,4,4,5,6,7,9,10,10,9)),
        { Servicing : ArrayType = }
            ((3,4,4,5,6,7,8,10,10,10),
             (4,4,5,6,7,8,9,10,10,9),
             (10,10,9,8,7,6,5,4,4,3),
             (9,9,9,8,7,6,5,4,3,3)),
        { Challenge : ArrayType = }
            ((10,10,9,8,6,5,4,3,3,3),
             (9,8,7,6,5,4,4,3,3,3),
             (3,3,4,5,5,5,7,10,10,9),
             (3,3,4,5,5,6,7,9,10,10)),
        { Starter : ArrayType = }
            ((10,10,9,8,7,5,4,3,3,3),
             (9,10,9,8,6,4,3,3,3,3),
             (3,3,3,4,4,5,7,10,10,10),
             (3,3,3,4,4,6,8,10,10,10)),
        { Results : ArrayType = }
            ((10,10,8,7,6,5,4,4,3,3),
             (8,7,6,5,4,4,3,3,3,3),
             (3,3,3,4,5,6,8,9,9,9),
             (3,3,3 4,5,6,7,9,10,10)),
        { Prospecting : ArrayType = }
            ((10,10,9,8,7,6,5,4,3,3),
             (10,10,9,8,7,5,4,3,3,3),
             (3,3,3,4,5,7,8,9,10,10),
             (3,3,3,4,5,6,7,8,10,10)),
        { Persuasion : ArrayType = }
            ((9,10,10,8,7,6,4,3,3,3),
             (8,10,9,8,7,5,4,3,3,3),
             (3,4,4,5,5,6,7,9,10,10),
             (3,3,4,5,5,7,9,10,9,9)),
        { Confidence : ArrayType = }
            ((10,10,9,8,7,5,4,3,3,3),
             (8,9,7,5,5,4,4,3,3,3),
             (3,3,4,5,5,7,8,9,9,9),
             (3,3,3,4,5,6,7,9,10,10)),
        { Consistency : ArrayType = }
            ((4,4,4,4,5,7,8,10,10,10),
             (3,3,4,4,5,6,8,9,10,10),
             (10,10,8,7,6,5,4,3,3,3),
             (10,10,9,8,7,6,5,4,3,3)),
        { Listening : ArrayType = }
```

```
    ((3,4,4,5,5,6,7,9,10,10),
     (3,4,4,5,5,6,7,9,10,10),
     (10,10,9,8,6,5,5,4,3,3),
     (10,10,9,8,7,6,5,4,3,3)),
  { Relations : ArrayType = }
    ((7,10,8,7,6,6,7,10,10,10),
     (8,10,8,7,6,5,4,4,3,3),
     (10,10,9,8,7,6,7,8,7,7),
     (8,8,7,7,6,6,6,5,5,3)),
  { Product : ArrayType =}
    ((4,5,5,5,5,7,8,10,10,10),
     (4,5,5,5,5,7,8,9,10,10),
     (10,10,8,7,6,5,5,4,3,3),
     (10,10,9,8,7,6,5,5,4,3)),
  { FollowUp : ArrayType = }
    ((4,5,5,5,6,7,8,9,10,10),
     (3,4,4,5,5,6,8,10,10,9),
     (10,10,9,8,7,6,5,4,4,3),
     (8,10,9,8,7,6,5,4,4,3)),
  { PaperWork : ArrayType = }
    ((3,4,5,5,5,6,7,9,10,10),
     (3,4,4,5,5,6,8,9,10,10),
     (10,10,9,8,6,5,4,4,3,3),
     (10,10,9,8,6,6,5,4,3,3)));
```

Second, reproduced below are the "values" lookup tables for the seventeen sales behavior factors. They are used like described previously—to establish a numerical rating for "values" that will be used to make up the "values" portion of horizontal bar graphs like those of FIGS. 7A and 7B as created for a sales job analysis.

VALUES LOOKUP TABLES FOR SALES

```
ValuesLookupTable : ValuesLookupTableType =
{PREPARATION}
(((8,10,6,4,2),
(10,10,6,4,2),
(7,10,6,4,2),
(255,255,255,255,255),
(10,10,6,4,0),
(255,255,255,255,255)),          {Objections : ArrayType =}
{PRESENTATION}                    ((2,255,255,255,2),
((0,255,255,255,0),               (10,8,6,4,2),
(8,10,6,4,2),                     (10,255,255,255,255),
(255,255,255,255,255),            (2,255,255,255,2),
(255,255,255,255,255),            (7,10,6,4,2),
(10,10,6,4,2),                    (2,255,255,255,2)),
(0,4,6,10,8),                     {Closing : ArrayType =}
                                  ((2,4,6,10,10),
                                  (8,10,6,4,2),
                                  (8,10,6,255,255),
                                  (2,4,6,10,10),
                                  (8,10,6,4,2),
                                  (255,255,255,255,255)),
                                  {Servicing : ArrayType =}
                                  ((10,8,255,255,2),
                                  (10,10,6,4,2),
                                  (10,8,255,255,255),
                                  (10,10,6,4,2),
                                  (2,4,255,255,255),
                                  (255,255,255,255,255)),
                                  {Challenge : ArrayType =}
                                  ((2,255,255,255,255),
                                  (10,10,6,4,2),
                                  (10,10,6,255,255),
                                  (2,4,6,10,10),
                                  (10,10,6,4,2),
                                  (2,4,6,8,10)),
                                  {Starter : ArrayType =}
                                  ((2,255,255,255,255),
                                  (10,10,6,4,2),
                                  (8,10,6,255,255),
                                  (2,4,6,10,10),
                                  (10,10,6,4,2),
                                  (2,255,255,10,10)),
```

VALUES LOOKUP TABLES FOR SALES

```
                                  {Results : ArrayType =}
                                  ((2,255,255,255,255),
                                  (10,10,6,4,2),
                                  (10,10,6,255,255)),
(2,4,0,10,10),
(10,10,6,4,2),
(2,4,6,8,10)),
{Prospecting : Array Table ={
((2,255,255,255,255),
(10,10,6,4,2),
(8,10,6,255,255),
(10,10,255,255,255),
(10,10,6,4,2),
(6,8,255,255,255)),
{Persuasion : ArrayType =}
((2,255,255,255,255),
(10,10,6,4,2),
(6,10,255,255,255),
(2,4,6,10,6),
(8,10,6,4,2),
(2,4,6,10,10)),
{Confidence : ArrayType =}
((255,255,255,255,255),
(10,10,6,4,2),
(8,10,6,4,2),
(2,4,6,10,10),
(10,10,6,4,2),
(255,255,255,255,255)),
{Consistency : ArrayType =}
((10,10,255,255,255),
(6,10,6,4,2),
(255,255,255,255,255),
(255,255,255,255,255),
(8,10,6,4,2),
(10,10,6,255,6)),
{Listening : ArrayType =}
((10,10,6,4,2),
(10,10,6,255,255),
(10,10,6,255,255),
(6,10,6,255,2),
(8,10,6,10,8),
(2,4,6,255,255)),
{Relations : ArrayType =}
((2,255,255,255,255),
(8,10,6,255,255),
(2,255,255,255,255),
(10,10,6,255,2),
(6,255,255,255,255),
(2,6,8,255,255)),
```

VALUES LOOKUP TABLES FOR SALES

```
{Product : ArrayType =}
((10,10,6,255,2),
(255,255,255,255,255),
(255,255,255,255,255),
(255,255,255,255,255),
(6,10,6,4,2),
(255,255,255,255,255)),
{FollowUp : ArrayType =}
((2,255,255,255,2),
(10,10,6,4,2),
(255,255,255,255,255),
(10,10,6,4,2),
(6,8,6,4,2),
(255,255,255,255,255)),
{PaperWork : ArrayType =}
((10,10,6,4,2),
(255,255,255,255,255),
(8,10,6,255,255),
(255,255,255,255,255),
(2,4,6,8,10),
(8,10,6,4,2)));
```

Once the information from the behavior and values questionnaires are stored, the system is able to evaluate those answers with regard to separate jobs; in this preferred embodiment either management and sales. It is to be understood that other jobs can be utilized with this system, but it would require separate creation of specific behavioral factors and values factors that are correlated to this specific job.

I. Features, Options, Alternatives

It will be appreciated that the present invention can take many different forms and embodiments. The true essence and spirit of this invention are defined in the appended claims, and it is not intended that the embodiment of the invention presented herein should limit the scope thereof.

It is to be understood that the present system allows the company to screen or analyze individuals for particular jobs in a manner that is independent of anything except behavior and values. It allows the company to avoid potentially biasing factors and to have a consistent expert system to allow evaluation of individuals.

The system integrates a variety of different characteristics of behavior and values in a manner which increases the ability of the company to accurately predict the potential of success of individuals for a particular job. For example, the behavior of being a good listener is generally regarded as an important attribute for a good manager. A person, however, who believes themselves to be a good listener, but who also has a high sense of urgency (another behavioral factor) may not in reality be a good listener because those two behavioral characteristics strongly compete. Additionally, values factors of the individual may affect the rating.

The correlation of responses to the behavior and values questionnaires and to the ratings or the quantization and rating of an individual with a standard, allows comparison of the individual to either theoretical or actual standards of high performance.

The system can therefore be actually self validating; in the sense that the results of superior performers can be produced by the system and other individuals and then the results of other individuals can be compared to those superior performers. It has been found that behavior and values are job performance related. It allows an almost complete elimination of bias and evaluation of an individual. In the preferred embodiment behavior and values are weighed approximately 50/50 with regard to prediction of job success. It is to be understood, however, that values might be weighted higher, at least for certain jobs. Values seem to control mode of which could indicate values should be rated higher, and that values could make up for lower behavior scores.

A central portion of the invention is the understanding that merger of information on both behavior and values is more effective at predicting job performance success than behavior individually, values individually, or other types of information.

It is also essential to an understanding in the invention that the works of such persons as Sprannger and Alport, Bernon, and Lindsey in "Study of Values" published earlier in this century form the basis for selection of the overall values factors and the specific questions on questionnaire 22. The works by those such as Marsten are used to select the behavior factors and the wording used on behavior questionnaire 20. The precise wording and precise weighting of how the various behavior and values factors corollate as a part of the invention. The validity of the specific choices has been validated by checking and re-checking those choices against many individuals.

For example, the specific behavior factors for management or sales were selected based on an evaluation of those jobs. Each of those behavior factors was then evaluated in light of the overall behavior characteristics D, I, S, C and overall values characteristics T, E, A, S, P, R and how they interacted. The lookup tables were then created. The lookup tables were also validated by testing.

It is also to be understood that once the reports, for example, FIG. 7A of FIG. 7B are generated, they must be evaluated on the basis of the specific environment at hand. That environment may contain knowledge about the current management or sales force, coworkers, or expectations involved for that job.

What is claimed is:

1. A method of using behavioral and value characteristics of an individual to evaluate potential for a specific job comprising:

presenting to the individual selected questions related to behavior characteristics relevent to the job;

presenting to the individual selected question related to values characteristics relevant to the job;

recording and relating answers to the questions related to the behavior characteristics to a plurality of behavior categories relevant to the job;

recording and relating answers to the question related to values to a plurality of values categories relevant to the job;

recording and scoring the related answers to a predetermined score on a pre-selected scale or scores based on determination on the importance of the behavioral and value characteristic to the job;

recording and correlating the related answers to specific predetermined numerical values in the predetermined range for a plurality of behavior factors relevant to the job and to values related to the job;

averaging the numerical values by the number of behavior characteristics and value characteristics to maintain an average score within the range for behavior and values;

adding the behavior numerical value and values numerical values for the specific behavioral factor;

dividing the sum of the numerical value by two to weight behavior and values approximately equally for each behavior factor; and presenting in a report the results of the weighted calculation of each behavioral factor based on behavior and values.

2. The method of claim 1 wherein the specific job is a management job.

3. The method of claim 1 wherein the specific job is a sales job.

4. A method of predicting success of an individual for a particular job comprising:

determining a plurality of overall behavioral characteristics for individual's relevant to work environment;

determining a plurality of overall values characteristics for individual's relevant to work environment;

presenting questions to the individual based on the overall behavioral and values characteristics, the questions including answers options correlated to the overall behavioral values characteristics;

deriving and recordings, from answers of the individuals to the questions, an overall rating of the individual for each behavior characteristic and correlating each rating to a common scale, and each value characteristic;

determining the interrelationship between the overall behavioral and values characteristics and a plurality of behavior factors specifically identified as being relevant to a particular job;

assigning numerical ratings based on said interrelationship so that overall behavior characteristics are weighed with respect to their effect on said specific behavior factors for said particular job, and overall values characteristics are weighed with respect to their effects on said specific behavior factors for the particular job;

creating averages on a common scale of the numerical ratings for each overall behavior and value characteristic for a specific behavior factor;

combining the averages into a merged score of behavior and values for each behavior factor and generating a report; and analyzing the work environment of the particular job and predicting the individuals success for the particular job by comparing the merged score for each behavior factor with the actual work environment.

5. The method of claim 4, wherein overall behavioral characteristics are analyzed with respect to basic behavior and response to work environment behavior based on the individual's answers.

6. The method of claim 5, wherein the steps of determining the interrelationship, assigning numerical ratings, creating averages, and combining averages are applied to basic behavior and response to work environment behavior to produced two merged behavior and values scores for each behavior factor.

* * * * *

UNITED STATES PATENT AND TRADEMARK OFFICE
CERTIFICATE OF CORRECTION

PATENT NO. : 5,551,880
DATED : September 3, 1996
INVENTOR(S) : Bonnstetter, et al.

It is certified that error appears in the above-indentified patent and that said Letters Patent is hereby corrected as shown below:

In Claim 1, column 26, line 45, please delete [question] and substitute --questions--.

In Claim 1, column 26, line 50, please delete [scale or scores] and substitute --scale of scores--.

In Claim 1, column 26, line 50, please delete [on] and substitute --of--.

In Claim 4, column 27, line 16 please delete [recordings] to -- recording--.

Signed and Sealed this

Twenty-fourth Day of December, 1996

Attest:

BRUCE LEHMAN

Attesting Officer     Commissioner of Patents and Trademarks